(12) United States Patent
Nguyen

(10) Patent No.: US 10,052,551 B2
(45) Date of Patent: Aug. 21, 2018

(54) MULTI-FUNCTIONAL PERIPHERAL DEVICE

(75) Inventor: Binh T. Nguyen, Reno, NV (US)

(73) Assignee: Nguyen Gaming LLC, Reno, NV (US)

( * ) Notice: Subject to any disclaimer, the term of this patent is extended or adjusted under 35 U.S.C. 154(b) by 0 days.

(21) Appl. No.: 12/945,888

(22) Filed: Nov. 14, 2010

(65) Prior Publication Data

US 2012/0122584 A1   May 17, 2012

(51) Int. Cl.
*A63F 13/21* (2014.01)
*G07F 17/32* (2006.01)
*A63F 13/00* (2014.01)
*A63F 13/235* (2014.01)

(52) U.S. Cl.
CPC ............. *A63F 13/21* (2014.09); *A63F 13/00* (2013.01); *G07F 17/3206* (2013.01); *G07F 17/3209* (2013.01); *G07F 17/3223* (2013.01); *G07F 17/3225* (2013.01); *G07F 17/3251* (2013.01); *A63F 13/235* (2014.09)

(58) Field of Classification Search
CPC ...... G07F 7/0873; G07F 7/088; G07F 7/0887; G07F 7/0893; G07F 7/10; G07F 7/1008; A63F 13/21; A63F 13/00; A63F 13/235
USPC .......................... 463/25, 47; 704/39; 194/206
See application file for complete search history.

(56) References Cited

U.S. PATENT DOCUMENTS

| | | |
|---|---|---|
| 2,033,638 A | 3/1936 | Koppl |
| 2,062,923 A | 12/1936 | Nagy |
| 4,741,539 A | 5/1988 | Sutton et al. |
| 4,948,138 A | 8/1990 | Pease et al. |
| 5,067,712 A | 11/1991 | Georgilas |
| 5,429,361 A | 7/1995 | Raven et al. |
| 5,489,103 A | 2/1996 | Okamoto |
| 5,630,757 A | 5/1997 | Gagin |
| 5,655,961 A | 8/1997 | Acres et al. |
| 5,704,835 A | 1/1998 | Dietz, II |
| 5,727,786 A | 3/1998 | Weingardt |
| 5,833,537 A | 11/1998 | Barrie |
| 5,919,091 A | 7/1999 | Bell et al. |
| 5,947,820 A | 9/1999 | Morro et al. |
| 5,997,401 A | 12/1999 | Crawford |
| 6,001,016 A | 12/1999 | Walker et al. |
| 6,039,648 A | 3/2000 | Guinn et al. |
| 6,059,289 A | 5/2000 | Vancura |

(Continued)

FOREIGN PATENT DOCUMENTS

| | | |
|---|---|---|
| GB | 2033638 | 5/1980 |
| GB | 2062923 | 5/1981 |

(Continued)

OTHER PUBLICATIONS

Benston, Liz, "Harrahs Launches iPhone App; Caesars Bypasses Check-in," Las Vegas Sun, Las Vegas, NV. Jan. 8, 2010.

(Continued)

*Primary Examiner* — Werner Garner

(57) ABSTRACT

A system, apparatus, and method for communicating information between a gaming device and a portable electronic device using a multi-functional peripheral device associated with the gaming device are disclosed. The multi-functional peripheral device may include a sensor to detect sensory input from the user and/or the portable electronic device associated with the user to play a game of chance on the gaming device.

28 Claims, 18 Drawing Sheets

(56) References Cited

U.S. PATENT DOCUMENTS

| | | |
|---|---|---|
| 6,089,977 A | 7/2000 | Bennett |
| 6,095,920 A | 8/2000 | Sudahiro |
| 6,110,041 A | 8/2000 | Walker et al. |
| 6,142,872 A | 11/2000 | Walker et al. |
| 6,146,273 A | 11/2000 | Olsen |
| 6,165,071 A | 12/2000 | Weiss |
| 6,231,445 B1 | 5/2001 | Acres |
| 6,270,412 B1 | 8/2001 | Crawford et al. |
| 6,290,600 B1 | 9/2001 | Glasson |
| 6,293,866 B1 | 9/2001 | Walker et al. |
| 6,353,390 B1 | 3/2002 | Beri et al. |
| 6,364,768 B1 | 4/2002 | Acres et al. |
| 6,404,884 B1 | 6/2002 | Marwell et al. |
| 6,416,406 B1 | 7/2002 | Duhamel |
| 6,416,409 B1 | 7/2002 | Jordan |
| 6,443,452 B1 | 9/2002 | Brune |
| 6,491,584 B2 | 12/2002 | Graham et al. |
| 6,505,095 B1 | 1/2003 | Kolls |
| 6,508,710 B1 | 1/2003 | Paravia et al. |
| 6,561,900 B1 | 5/2003 | Baerlocker et al. |
| 6,592,457 B1 | 7/2003 | Frohm et al. |
| 6,612,574 B1 | 9/2003 | Cole et al. |
| 6,620,046 B2 | 9/2003 | Rowe |
| 6,641,477 B1 | 11/2003 | Dietz, II |
| 6,645,078 B1 | 11/2003 | Mattice |
| 6,719,630 B1 | 4/2004 | Seelig et al. |
| 6,749,510 B2 | 6/2004 | Giobbi |
| 6,758,757 B2 | 7/2004 | Luciano, Jr. et al. |
| 6,773,345 B2 | 8/2004 | Walker et al. |
| 6,778,820 B2 | 8/2004 | Tendler |
| 6,780,111 B2 | 8/2004 | Cannon et al. |
| 6,799,032 B2 | 9/2004 | McDonnell et al. |
| 6,800,027 B2 | 10/2004 | Giobbi et al. |
| 6,804,763 B1 | 10/2004 | Stockdale et al. |
| 6,811,486 B1 | 11/2004 | Luciano, Jr. |
| 6,843,725 B2 | 1/2005 | Nelson |
| 6,846,238 B2 | 1/2005 | Wells |
| 6,848,995 B1 | 2/2005 | Walker et al. |
| 6,852,029 B2 | 2/2005 | Baltz et al. |
| 6,869,361 B2 | 3/2005 | Sharpless et al. |
| 6,875,106 B2 | 4/2005 | Weiss et al. |
| 6,884,170 B2 | 4/2005 | Rowe |
| 6,884,172 B1 | 4/2005 | Lloyd et al. |
| 6,902,484 B2 | 6/2005 | Idaka |
| 6,908,390 B2 | 6/2005 | Nguyen et al. |
| 6,913,532 B2 | 7/2005 | Bearlocher et al. |
| 6,923,721 B2 | 8/2005 | Luciano et al. |
| 6,935,958 B2 | 8/2005 | Nelson |
| 6,949,022 B1 | 9/2005 | Showers |
| 6,955,600 B2 | 10/2005 | Glavich et al. |
| 6,971,956 B2 | 12/2005 | Rowe et al. |
| 6,984,174 B2 | 1/2006 | Cannon et al. |
| 6,997,803 B2 | 2/2006 | LeMay et al. |
| 7,018,292 B2 | 3/2006 | Tracy et al. |
| 7,032,115 B2 | 4/2006 | Kashani |
| 7,033,276 B2 | 4/2006 | Walker et al. |
| 7,035,626 B1 | 4/2006 | Luciano |
| 7,037,195 B2 | 5/2006 | Schneider et al. |
| 7,048,628 B2 | 5/2006 | Schneider |
| 7,048,630 B2 | 5/2006 | Berg et al. |
| 7,063,617 B2 | 6/2006 | Brosnan et al. |
| 7,076,329 B1 | 7/2006 | Kolls |
| 7,089,264 B1 | 8/2006 | Guido et al. |
| 7,094,148 B2 | 8/2006 | Bearlocher et al. |
| 7,105,736 B2 | 9/2006 | Laakso |
| 7,111,141 B2 | 9/2006 | Nelson |
| 7,144,321 B2 | 12/2006 | Mayeroff |
| 7,152,783 B2 | 12/2006 | Charrin |
| 7,169,041 B2 | 1/2007 | Tessmer et al. |
| 7,169,052 B2 | 1/2007 | Beaulieu et al. |
| 7,175,523 B2 | 2/2007 | Gilmore et al. |
| 7,181,228 B2 | 2/2007 | Boesch |
| 7,182,690 B2 | 2/2007 | Giobbi et al. |
| RE39,644 E | 5/2007 | Alcorn et al. |
| 7,243,104 B2 | 7/2007 | Bill |
| 7,247,098 B1 | 7/2007 | Bradford et al. |
| 7,259,718 B2 | 8/2007 | Patterson et al. |
| 7,275,989 B2 | 10/2007 | Moody |
| 7,285,047 B2 | 10/2007 | Gielb et al. |
| 7,314,408 B2 | 1/2008 | Cannon et al. |
| 7,316,615 B2 | 1/2008 | Soltys et al. |
| 7,316,619 B2 | 1/2008 | Nelson |
| 7,318,775 B2 | 1/2008 | Brosnan et al. |
| 7,326,116 B2 | 2/2008 | O'Donovan et al. |
| 7,330,108 B2 | 2/2008 | Thomas |
| 7,346,358 B2 | 3/2008 | Wood et al. |
| 7,355,112 B2 | 4/2008 | Laakso |
| 7,384,338 B2 | 6/2008 | Rothschild et al. |
| 7,387,571 B2 | 6/2008 | Walker et al. |
| 7,393,278 B2 | 7/2008 | Gerson et al. |
| 7,396,990 B2 | 7/2008 | Lu et al. |
| 7,415,426 B2 | 8/2008 | Williams et al. |
| 7,425,177 B2 | 9/2008 | Rodgers et al. |
| 7,427,234 B2 | 9/2008 | Soltys et al. |
| 7,427,236 B2 | 9/2008 | Kaminkow et al. |
| 7,427,708 B2 | 9/2008 | Ohmura |
| 7,431,650 B2 | 10/2008 | Kessman |
| 7,448,949 B2 | 11/2008 | Kaminkow et al. |
| 7,500,913 B2 | 3/2009 | Baerlocher |
| 7,510,474 B2 | 3/2009 | Carter |
| 7,513,828 B2 | 4/2009 | Nguyen et al. |
| 7,519,838 B1 | 4/2009 | Suurballe |
| 7,559,838 B2 | 7/2009 | Walker et al. |
| 7,563,167 B2 | 7/2009 | Walker et al. |
| 7,572,183 B2 | 8/2009 | Olivas et al. |
| 7,585,222 B2 | 9/2009 | Muir |
| 7,602,298 B2 | 10/2009 | Thomas |
| 7,607,174 B1 | 10/2009 | Kashchenko et al. |
| 7,611,409 B2 | 11/2009 | Muir et al. |
| 7,637,810 B2 | 12/2009 | Amaitis et al. |
| 7,644,861 B2 | 1/2010 | Alderucci et al. |
| 7,653,757 B1 | 1/2010 | Fernald et al. |
| 7,693,306 B2 | 4/2010 | Konami |
| 7,699,703 B2 | 4/2010 | Muir et al. |
| 7,722,453 B2 | 5/2010 | Lark et al. |
| 7,758,423 B2 | 7/2010 | Foster et al. |
| 7,771,271 B2 | 8/2010 | Walker et al. |
| 7,780,529 B2 | 8/2010 | Rowe et al. |
| 7,780,531 B2 | 8/2010 | Englman et al. |
| 7,785,192 B2 | 8/2010 | Canterbury et al. |
| 7,811,172 B2 | 10/2010 | Asher et al. |
| 7,819,749 B1 | 10/2010 | Fish |
| 7,822,688 B2 | 10/2010 | Labron |
| 7,828,652 B2 | 11/2010 | Nguyen et al. |
| 7,828,654 B2 | 11/2010 | Carter |
| 7,828,661 B1 | 11/2010 | Fish |
| 7,850,528 B2 | 12/2010 | Wells |
| 7,874,919 B2 | 1/2011 | Paulsen et al. |
| 7,877,798 B2 | 1/2011 | Saunders et al. |
| 7,883,413 B2 | 2/2011 | Paulsen |
| 7,892,097 B2 | 2/2011 | Muir et al. |
| 7,909,692 B2 | 3/2011 | Nguyen et al. |
| 7,909,699 B2 | 3/2011 | Parrott et al. |
| 7,918,728 B2 | 4/2011 | Nguyen et al. |
| 7,927,211 B2 | 4/2011 | Rowe et al. |
| 7,927,212 B2 | 4/2011 | Hedrick et al. |
| 7,951,008 B2 | 5/2011 | Wolf et al. |
| 8,057,298 B2 | 11/2011 | Nguyen et al. |
| 8,057,303 B2 | 11/2011 | Rasmussen |
| 8,087,988 B2 | 1/2012 | Nguyen et al. |
| 8,117,608 B1 | 2/2012 | Slettehaugh |
| 8,133,113 B2 | 3/2012 | Nguyen |
| 8,182,326 B2 | 5/2012 | Speer et al. |
| 8,210,927 B2 | 7/2012 | Hedrick |
| 8,221,245 B2 | 7/2012 | Walker |
| 8,226,459 B2 | 7/2012 | Barrett |
| 8,226,474 B2 | 7/2012 | Nguyen et al. |
| 8,231,456 B2 | 7/2012 | Zielinski |
| 8,235,803 B2 | 8/2012 | Loose et al. |
| 8,282,475 B2 | 10/2012 | Nguyen et al. |
| 8,323,099 B2 | 12/2012 | Durham et al. |
| 8,337,290 B2 | 12/2012 | Nguyen et al. |
| 8,342,946 B2 | 1/2013 | Amaitis |
| 8,393,948 B2 | 3/2013 | Allen et al. |

(56) References Cited

U.S. PATENT DOCUMENTS

| | | |
|---|---|---|
| 8,430,745 B2 | 4/2013 | Agarwal et al. |
| 8,461,958 B2 | 6/2013 | Saenz et al. |
| 8,469,813 B2 | 6/2013 | Joshi |
| 8,529,345 B2 | 9/2013 | Nguyen |
| 8,602,875 B2 | 12/2013 | Nguyen |
| 8,613,659 B2 | 12/2013 | Nelson et al. |
| 8,696,470 B2 | 4/2014 | Nguyen |
| 8,745,417 B2 | 6/2014 | Huang et al. |
| 8,858,323 B2 | 10/2014 | Nguyen et al. |
| 8,864,586 B2 | 10/2014 | Nguyen |
| 8,942,995 B1 | 1/2015 | Kerr |
| 9,039,507 B2 | 5/2015 | Allen et al. |
| 9,235,952 B2 | 1/2016 | Nguyen |
| 9,325,203 B2 | 4/2016 | Nguyen |
| 9,466,171 B2 | 10/2016 | Hornik |
| 9,483,901 B2 | 11/2016 | Nguyen |
| 9,486,697 B2 | 11/2016 | Nguyen |
| 9,486,704 B2 | 11/2016 | Nguyen |
| 9,576,425 B2 | 2/2017 | Nguyen |
| 9,626,826 B2 | 4/2017 | Nguyen |
| 9,666,021 B2 | 5/2017 | Nguyen |
| 9,672,686 B2 | 6/2017 | Nguyen |
| 2001/0016516 A1 | 8/2001 | Takatsuka |
| 2001/0024971 A1 | 9/2001 | Brossard |
| 2001/0047291 A1 | 11/2001 | Garahi |
| 2002/0006822 A1 | 1/2002 | Krintzman |
| 2002/0042295 A1 | 4/2002 | Walker et al. |
| 2002/0111210 A1 | 8/2002 | Luciano, Jr. et al. |
| 2002/0111213 A1 | 8/2002 | McEntee et al. |
| 2002/0113369 A1 | 8/2002 | Weingardt |
| 2002/0116615 A1 | 8/2002 | Nguyen et al. |
| 2002/0133418 A1 | 9/2002 | Hammond et al. |
| 2002/0142825 A1 | 10/2002 | Lark et al. |
| 2002/0147047 A1 | 10/2002 | Letovsky et al. |
| 2002/0147049 A1 | 10/2002 | Carter, Sr. |
| 2002/0151366 A1 | 10/2002 | Walker et al. |
| 2002/0167536 A1 | 11/2002 | Valdes et al. |
| 2002/0183105 A1 | 12/2002 | Cannon et al. |
| 2003/0001338 A1 | 1/2003 | Bennett et al. |
| 2003/0008696 A1 | 1/2003 | Abecassis et al. |
| 2003/0027635 A1 | 2/2003 | Walker et al. |
| 2003/0064805 A1 | 4/2003 | Wells |
| 2003/0064807 A1 | 4/2003 | Walker et al. |
| 2003/0092480 A1 | 5/2003 | White et al. |
| 2003/0100361 A1 | 5/2003 | Sharpless et al. |
| 2003/0103965 A1 | 6/2003 | Jung et al. |
| 2003/0104860 A1 | 6/2003 | Cannon et al. |
| 2003/0104865 A1 | 6/2003 | Itkis et al. |
| 2003/0148809 A1 | 8/2003 | Nelson |
| 2003/0162588 A1 | 8/2003 | Brosnan et al. |
| 2003/0195024 A1 | 10/2003 | Slattery |
| 2003/0199295 A1 | 10/2003 | Vancura |
| 2003/0224852 A1 | 12/2003 | Walker et al. |
| 2003/0224854 A1 | 12/2003 | Joao |
| 2004/0002386 A1 | 1/2004 | Wolfe et al. |
| 2004/0005919 A1 | 1/2004 | Walker et al. |
| 2004/0023709 A1 | 2/2004 | Beaulieu et al. |
| 2004/0023716 A1 | 2/2004 | Gauselmann |
| 2004/0048650 A1 | 3/2004 | Mierau et al. |
| 2004/0068460 A1 | 4/2004 | Feeley |
| 2004/0082385 A1 | 4/2004 | Silva et al. |
| 2004/0106449 A1 | 6/2004 | Walker et al. |
| 2004/0137987 A1 | 6/2004 | Nguyen et al. |
| 2004/0127277 A1 | 7/2004 | Walker |
| 2004/0127290 A1 | 7/2004 | Walker et al. |
| 2004/0147308 A1 | 7/2004 | Walker et al. |
| 2004/0152508 A1 | 8/2004 | Lind |
| 2004/0214622 A1 | 10/2004 | Atkinson |
| 2004/0224753 A1 | 11/2004 | Odonovan et al. |
| 2004/0256803 A1 | 12/2004 | Ko |
| 2004/0259633 A1 | 12/2004 | Gentles et al. |
| 2005/0003890 A1 | 1/2005 | Hedrick et al. |
| 2005/0004980 A1 | 1/2005 | Vadjinia |
| 2005/0026696 A1 | 2/2005 | Hashimoto et al. |
| 2005/0054446 A1 | 3/2005 | Kammler |
| 2005/0101376 A1 | 5/2005 | Walker et al. |
| 2005/0101383 A1 | 5/2005 | Wells |
| 2005/0130728 A1 | 6/2005 | Nguyen et al. |
| 2005/0137014 A1 | 6/2005 | Vetelaninen |
| 2005/0181865 A1 | 8/2005 | Luciano |
| 2005/0181870 A1 | 8/2005 | Nguyen et al. |
| 2005/0181875 A1 | 8/2005 | Hoehne |
| 2005/0187020 A1 | 8/2005 | Amaitis et al. |
| 2005/0202875 A1 | 9/2005 | Murphy et al. |
| 2005/0209002 A1 | 9/2005 | Blythe et al. |
| 2005/0221881 A1 | 10/2005 | Lannert |
| 2005/0223219 A1 | 10/2005 | Gatto et al. |
| 2005/0239546 A1 | 10/2005 | Hedrick |
| 2005/0273635 A1 | 12/2005 | Wilcox et al. |
| 2005/0277471 A1 | 12/2005 | Russell et al. |
| 2005/0282637 A1 | 12/2005 | Gatto et al. |
| 2006/0009283 A1 | 1/2006 | Englman et al. |
| 2006/0036874 A1 | 2/2006 | Cockerille |
| 2006/0046822 A1 | 3/2006 | Kaminkow et al. |
| 2006/0046830 A1 | 3/2006 | Webb |
| 2006/0046849 A1 * | 3/2006 | Kovacs .......................... 463/39 |
| 2006/0068893 A1 | 3/2006 | Jaffe et al. |
| 2006/0073869 A1 | 4/2006 | LeMay et al. |
| 2006/0073897 A1 | 4/2006 | Englman et al. |
| 2006/0079317 A1 | 4/2006 | Flemming et al. |
| 2006/0148551 A1 | 7/2006 | Walker et al. |
| 2006/0189382 A1 | 8/2006 | Muir et al. |
| 2006/0217170 A1 | 9/2006 | Roireau |
| 2006/0217193 A1 | 9/2006 | Walker et al. |
| 2006/0247028 A1 | 11/2006 | Brosnan et al. |
| 2006/0247035 A1 | 11/2006 | Rowe et al. |
| 2006/0252530 A1 | 11/2006 | Oberberger et al. |
| 2006/0253481 A1 | 11/2006 | Guido et al. |
| 2006/0281525 A1 | 12/2006 | Borissov |
| 2006/0281541 A1 | 12/2006 | Nguyen et al. |
| 2006/0287106 A1 | 12/2006 | Jensen |
| 2007/0004510 A1 * | 1/2007 | Underdahl et al. .......... 463/29 |
| 2007/0026935 A1 | 2/2007 | Wolf et al. |
| 2007/0026942 A1 | 2/2007 | Kinsley |
| 2007/0054739 A1 | 3/2007 | Amaitis et al. |
| 2007/0060254 A1 | 3/2007 | Muir |
| 2007/0060306 A1 | 3/2007 | Amaitis et al. |
| 2007/0060319 A1 | 3/2007 | Block et al. |
| 2007/0060358 A1 | 3/2007 | Amaitis et al. |
| 2007/0077981 A1 | 4/2007 | Hungate et al. |
| 2007/0087833 A1 | 4/2007 | Feeney et al. |
| 2007/0087834 A1 | 4/2007 | Moser et al. |
| 2007/0093299 A1 | 4/2007 | Bergeron |
| 2007/0129123 A1 | 6/2007 | Eryou et al. |
| 2007/0149279 A1 | 6/2007 | Norden et al. |
| 2007/0149286 A1 | 6/2007 | Bemmel |
| 2007/0159301 A1 | 7/2007 | Hirt et al. |
| 2007/0161402 A1 | 7/2007 | Ng et al. |
| 2007/0184896 A1 | 8/2007 | Dickerson |
| 2007/0184904 A1 | 8/2007 | Lee |
| 2007/0191109 A1 | 8/2007 | Crowder et al. |
| 2007/0207852 A1 | 9/2007 | Nelson et al. |
| 2007/0207854 A1 | 9/2007 | Wolf et al. |
| 2007/0238505 A1 | 10/2007 | Okada |
| 2007/0241187 A1 | 10/2007 | Alderucci et al. |
| 2007/0248036 A1 | 10/2007 | Nevalainen |
| 2007/0257430 A1 | 11/2007 | Hardy et al. |
| 2007/0259713 A1 | 11/2007 | Fiden et al. |
| 2007/0259717 A1 | 11/2007 | Mattice et al. |
| 2007/0270213 A1 | 11/2007 | Nguyen et al. |
| 2007/0275777 A1 | 11/2007 | Walker et al. |
| 2007/0275779 A1 | 11/2007 | Amaitis et al. |
| 2007/0281782 A1 | 12/2007 | Amaitis et al. |
| 2007/0281785 A1 | 12/2007 | Amaitis et al. |
| 2007/0298873 A1 | 12/2007 | Nguyen et al. |
| 2008/0015032 A1 * | 1/2008 | Bradford et al. ............. 463/47 |
| 2008/0020824 A1 | 1/2008 | Cuddy et al. |
| 2008/0032787 A1 | 2/2008 | Low et al. |
| 2008/0070652 A1 | 3/2008 | Nguyen et al. |
| 2008/0070681 A1 | 3/2008 | Marks et al. |
| 2008/0076506 A1 | 3/2008 | Nguyen et al. |
| 2008/0076548 A1 | 3/2008 | Paulsen |
| 2008/0076572 A1 | 3/2008 | Nguyen et al. |
| 2008/0096650 A1 | 4/2008 | Baerlocher |

(56) References Cited

U.S. PATENT DOCUMENTS

| | | |
|---|---|---|
| 2008/0102956 A1 | 5/2008 | Burman et al. |
| 2008/0102957 A1 | 5/2008 | Burman et al. |
| 2008/0113772 A1 | 5/2008 | Burrill et al. |
| 2008/0119267 A1 | 5/2008 | Denlay |
| 2008/0139306 A1 | 6/2008 | Lutnick |
| 2008/0146321 A1 | 6/2008 | Parente |
| 2008/0150902 A1* | 6/2008 | Edpalm et al. ............... 345/173 |
| 2008/0153583 A1* | 6/2008 | Huntley et al. ................ 463/25 |
| 2008/0161110 A1 | 7/2008 | Campbell |
| 2008/0167106 A1 | 7/2008 | Lutnick et al. |
| 2008/0182667 A1 | 7/2008 | Davis et al. |
| 2008/0207307 A1 | 8/2008 | Cunningham, II et al. |
| 2008/0214258 A1 | 9/2008 | Brosnan et al. |
| 2008/0215319 A1 | 9/2008 | Lu |
| 2008/0234047 A1 | 9/2008 | Nguyen |
| 2008/0238610 A1 | 10/2008 | Rosenberg |
| 2008/0248849 A1 | 10/2008 | Lutnick |
| 2008/0254878 A1 | 10/2008 | Saunders et al. |
| 2008/0254881 A1 | 10/2008 | Lutnick et al. |
| 2008/0254883 A1 | 10/2008 | Patel et al. |
| 2008/0254891 A1 | 10/2008 | Saunders et al. |
| 2008/0254892 A1 | 10/2008 | Saunders et al. |
| 2008/0254897 A1 | 10/2008 | Saunders et al. |
| 2008/0263173 A1 | 10/2008 | Weber et al. |
| 2008/0300058 A1 | 12/2008 | Sum et al. |
| 2008/0305864 A1 | 12/2008 | Kelly et al. |
| 2008/0305865 A1 | 12/2008 | Kelly et al. |
| 2008/0305866 A1 | 12/2008 | Kelly et al. |
| 2008/0311994 A1 | 12/2008 | Amaitis et al. |
| 2008/0318669 A1 | 12/2008 | Buchholz |
| 2008/0318686 A1 | 12/2008 | Crowder et al. |
| 2009/0005165 A1 | 1/2009 | Arezina et al. |
| 2009/0011822 A1 | 1/2009 | Englman |
| 2009/0029766 A1 | 1/2009 | Lutnick et al. |
| 2009/0054149 A1 | 2/2009 | Brosnan et al. |
| 2009/0077396 A1 | 3/2009 | Tsai et al. |
| 2009/0088258 A1* | 4/2009 | Saunders et al. ............... 463/42 |
| 2009/0098925 A1 | 4/2009 | Gagner et al. |
| 2009/0104977 A1 | 4/2009 | Zielinski |
| 2009/0104983 A1 | 4/2009 | Okada |
| 2009/0118002 A1 | 5/2009 | Lyons |
| 2009/0118013 A1 | 5/2009 | Finnimore et al. |
| 2009/0118022 A1 | 5/2009 | Lyons et al. |
| 2009/0124366 A1 | 5/2009 | Aoki et al. |
| 2009/0124390 A1 | 5/2009 | Seelig et al. |
| 2009/0131151 A1 | 5/2009 | Harris et al. |
| 2009/0132163 A1 | 5/2009 | Ashley et al. |
| 2009/0137255 A1 | 5/2009 | Ashley, Jr. et al. |
| 2009/0138133 A1 | 5/2009 | Buchholz et al. |
| 2009/0149245 A1 | 6/2009 | Fabbri |
| 2009/0149261 A1 | 6/2009 | Chen et al. |
| 2009/0153342 A1* | 6/2009 | Thorn ................... G06F 1/1626 340/669 |
| 2009/0156303 A1 | 6/2009 | Kiely et al. |
| 2009/0176578 A1 | 7/2009 | Herrmann et al. |
| 2009/0191962 A1 | 7/2009 | Hardy et al. |
| 2009/0197684 A1 | 8/2009 | Arezina et al. |
| 2009/0216547 A1 | 8/2009 | Canora et al. |
| 2009/0219901 A1 | 9/2009 | Bull et al. |
| 2009/0221342 A1 | 9/2009 | Katz et al. |
| 2009/0227302 A1 | 9/2009 | Abe |
| 2009/0239666 A1 | 9/2009 | Hall et al. |
| 2009/0264190 A1 | 10/2009 | Davis et al. |
| 2009/0271287 A1 | 10/2009 | Halpern |
| 2009/0275411 A1 | 11/2009 | Kisenwether et al. |
| 2009/0282469 A1 | 11/2009 | Lynch |
| 2009/0298468 A1 | 12/2009 | Hsu |
| 2010/0002897 A1 | 1/2010 | Keady |
| 2010/0004058 A1 | 1/2010 | Acres |
| 2010/0016069 A1 | 1/2010 | Herrmann |
| 2010/0056248 A1 | 3/2010 | Acres |
| 2010/0062833 A1 | 3/2010 | Mattice et al. |
| 2010/0062840 A1 | 3/2010 | Herrmann et al. |
| 2010/0079237 A1 | 4/2010 | Falk |
| 2010/0081501 A1 | 4/2010 | Carpenter et al. |
| 2010/0099499 A1 | 4/2010 | Amaitis et al. |
| 2010/0106612 A1 | 4/2010 | Gupta |
| 2010/0120486 A1 | 5/2010 | DeWaal |
| 2010/0124967 A1 | 5/2010 | Lutnick et al. |
| 2010/0130276 A1 | 5/2010 | Fiden |
| 2010/0160035 A1 | 6/2010 | Herrmann |
| 2010/0160043 A1 | 6/2010 | Fujimoto et al. |
| 2010/0178977 A1 | 7/2010 | Kim et al. |
| 2010/0197383 A1 | 8/2010 | Rad et al. |
| 2010/0197385 A1 | 8/2010 | Aoki et al. |
| 2010/0203955 A1 | 8/2010 | Sylla |
| 2010/0203963 A1 | 8/2010 | Allen |
| 2010/0227662 A1 | 9/2010 | Speer et al. |
| 2010/0227670 A1* | 9/2010 | Arezina et al. ................ 463/25 |
| 2010/0227671 A1* | 9/2010 | Laaroussi ............... G07F 17/32 463/25 |
| 2010/0227687 A1 | 9/2010 | Speer et al. |
| 2010/0234091 A1 | 9/2010 | Baerlocher et al. |
| 2010/0279764 A1 | 11/2010 | Allen et al. |
| 2010/0323780 A1 | 12/2010 | Acres |
| 2010/0325703 A1 | 12/2010 | Etchegoyen |
| 2011/0009181 A1 | 1/2011 | Speer et al. |
| 2011/0039615 A1 | 2/2011 | Acres |
| 2011/0065492 A1 | 3/2011 | Acres |
| 2011/0111827 A1 | 5/2011 | Nicely et al. |
| 2011/0111860 A1 | 5/2011 | Nguyen |
| 2011/0118010 A1 | 5/2011 | Brune |
| 2011/0159966 A1 | 6/2011 | Gura et al. |
| 2011/0183732 A1 | 7/2011 | Block |
| 2011/0183749 A1 | 7/2011 | Allen |
| 2011/0207525 A1 | 8/2011 | Allen |
| 2011/0212711 A1 | 9/2011 | Scott |
| 2011/0212767 A1 | 9/2011 | Barclay et al. |
| 2011/0223993 A1 | 9/2011 | Allen et al. |
| 2011/0263318 A1* | 10/2011 | Agarwal et al. ................ 463/25 |
| 2011/0306400 A1 | 12/2011 | Nguyen |
| 2011/0306426 A1 | 12/2011 | Novak et al. |
| 2012/0015709 A1 | 1/2012 | Bennett et al. |
| 2012/0028718 A1 | 2/2012 | Barclay et al. |
| 2012/0034968 A1 | 2/2012 | Watkins et al. |
| 2012/0046110 A1 | 2/2012 | Amaitis |
| 2012/0094769 A1 | 4/2012 | Nguyen et al. |
| 2012/0100908 A1 | 4/2012 | Wells |
| 2012/0108319 A1 | 5/2012 | Caputo et al. |
| 2012/0122561 A1 | 5/2012 | Hedrick |
| 2012/0122567 A1 | 5/2012 | Gangadharan et al. |
| 2012/0122584 A1 | 5/2012 | Nguyen |
| 2012/0122590 A1 | 5/2012 | Nguyen |
| 2012/0172130 A1 | 7/2012 | Acres |
| 2012/0184362 A1 | 7/2012 | Barclay et al. |
| 2012/0184363 A1 | 7/2012 | Barclay et al. |
| 2012/0190426 A1 | 7/2012 | Acres |
| 2012/0194448 A1 | 8/2012 | Rothkopf |
| 2012/0208618 A1 | 8/2012 | Frerking |
| 2012/0231885 A1 | 9/2012 | Speer, II |
| 2012/0322563 A1 | 12/2012 | Nguyen et al. |
| 2012/0330740 A1 | 12/2012 | Pennington et al. |
| 2013/0005433 A1 | 1/2013 | Holch |
| 2013/0005443 A1 | 1/2013 | Kosta |
| 2013/0005453 A1 | 1/2013 | Nguyen et al. |
| 2013/0059650 A1 | 3/2013 | Sylla et al. |
| 2013/0065668 A1 | 3/2013 | LeMay |
| 2013/0281188 A1 | 3/2013 | Guinn |
| 2013/0132745 A1 | 5/2013 | Schoening et al. |
| 2013/0196756 A1 | 8/2013 | Nguyen |
| 2013/0196776 A1 | 8/2013 | Nguyen |
| 2013/0210513 A1 | 8/2013 | Nguyen |
| 2013/0210514 A1 | 8/2013 | Nguyen |
| 2013/0210530 A1 | 8/2013 | Nguyen |
| 2013/0225279 A1 | 8/2013 | Patceg |
| 2013/0252730 A1 | 9/2013 | Joshi |
| 2013/0316808 A1 | 11/2013 | Nelson |
| 2014/0006129 A1 | 1/2014 | Heath |
| 2014/0094295 A1 | 4/2014 | Nguyen |
| 2014/0094316 A1 | 4/2014 | Nguyen |
| 2014/0121005 A1 | 5/2014 | Nelson |
| 2014/0179431 A1 | 6/2014 | Nguyen |
| 2014/0274309 A1 | 9/2014 | Nguyen |
| 2014/0274319 A1 | 9/2014 | Nguyen |

(56) References Cited

U.S. PATENT DOCUMENTS

| | | |
|---|---|---|
| 2014/0274320 A1 | 9/2014 | Nguyen |
| 2014/0274342 A1 | 9/2014 | Nguyen |
| 2014/0274357 A1 | 9/2014 | Nguyen |
| 2014/0274360 A1 | 9/2014 | Nguyen |
| 2014/0274367 A1 | 9/2014 | Nguyen |
| 2014/0274388 A1 | 9/2014 | Nguyen |
| 2015/0089595 A1 | 3/2015 | Telles |
| 2015/0133223 A1 | 5/2015 | Carter |
| 2017/0116819 A1 | 4/2017 | Nguyen |
| 2017/0116823 A1 | 4/2017 | Nguyen |
| 2017/0144071 A1 | 5/2017 | Nguyen |
| 2017/0148259 A1 | 5/2017 | Nguyen |
| 2017/0148261 A1 | 5/2017 | Nguyen |
| 2017/0148263 A1 | 5/2017 | Nguyen |

FOREIGN PATENT DOCUMENTS

| | | |
|---|---|---|
| GB | 2096376 | 10/1982 |
| GB | 2097570 | 11/1982 |
| GB | 2335524 | 9/1999 |
| PH | 12005000454 | 5/2007 |
| WO | WO 05073933 | 8/2005 |
| WO | 200027621 A | 3/2008 |
| WO | WO 2008/027621 | 3/2008 |
| WO | 2010/017252 A1 | 2/2010 |
| WO | WO 2010/017252 A1 | 2/2010 |

OTHER PUBLICATIONS

Finnegan, Amanda, "Casinos Connecting with Customers via Iphone Apps", May 27, 2010, Las Vegas Sun, Las Vegas, NV.
Gaming Today Staff, "Slots showcased at 2009 National Indian Gaming Assoc.", GamingToday.com, Apr. 14, 2009.
Green, Marian,"Testing Texting Casino Journal", Mar. 2, 2009.
Hasan, Ragib, et al., "A Survey of Peer-to-Peer Storage Techniques for Distributed File Systems", National Center for Supercomputing Applications, Department of Computer Science, University of Illinois at Urbana Champain, Jun. 27, 2005.
Jones, Trahern, "Telecon-equipped drones could revolutionize wireless market", azcentral.com, http://www.azcentral.com/business/news/articles/20130424telecom-equipped-drones-could-revolutionize-wireless-market.html, downloaded Jul. 2, 2013, 2 pages.
Brochure, 5000 Ft. Inc., 1 page, Nov. 2010.
Frontier Fortune game, email notification, MGM Resorts Intl., Aug. 9, 2013.
"Getting Back in the Game: Geolocation Can Ensure Compliance with New iGaming Regulations", White Paper, Quova, Inc., 2010.
U.S. Appl. No. 12/945,888, filed Nov. 14, 2010.
U.S. Appl. No. 12/945,889, filed Nov. 14, 2010.
U.S. Appl. No. 13/622,702, filed Sep. 19, 2012.
U.S. Appl. No. 13/800,917, filed Mar. 13, 2013.
U.S. Appl. No. 13/296,182, filed Nov. 15, 2011.
U.S. Appl. No. 13/801,234, filed Mar. 13, 2013.
U.S. Appl. No. 13/801,171, filed Mar. 13, 2013.
U.S. Appl. No. 13/843,192, filed Mar. 15, 2013.
U.S. Appl. No. 13/843,087, filed Mar. 15, 2013.
U.S. Appl. No. 13/632,743, filed Oct. 1, 2012.
U.S. Appl. No. 13/632,828, filed Oct. 1, 2012.
U.S. Appl. No. 13/833,953, filed Mar. 15, 2013.
U.S. Appl. No. 12/619,672, filed Nov. 16, 2009.
U.S. Appl. No. 13/807,121, filed Mar. 13, 2013.
U.S. Appl. No. 12/581,115, filed Oct. 17, 2009.
U.S. Appl. No. 13/801,076, filed Mar. 13, 2013.
U.S. Appl. No. 13/617,717, filed Nov. 12, 2009.
U.S. Appl. No. 13/633,118, filed Oct. 1, 2012.
U.S. Appl. No. 12/797,610, filed Jun. 10, 2010.
U.S. Appl. No. 13/801,256, filed Mar. 13, 2013.
U.S. Appl. No. 12/757,968, filed Apr. 9, 2010.
U.S. Appl. No. 12/797,616, filed Jun. 10, 2010.
U.S. Appl. No. 13/557,063, filed Jul. 24, 2012.
U.S. Appl. No. 13/833,116, filed Mar. 15, 2013.
U.S. Appl. No. 13/801,271, filed Mar. 13, 2011.

* cited by examiner

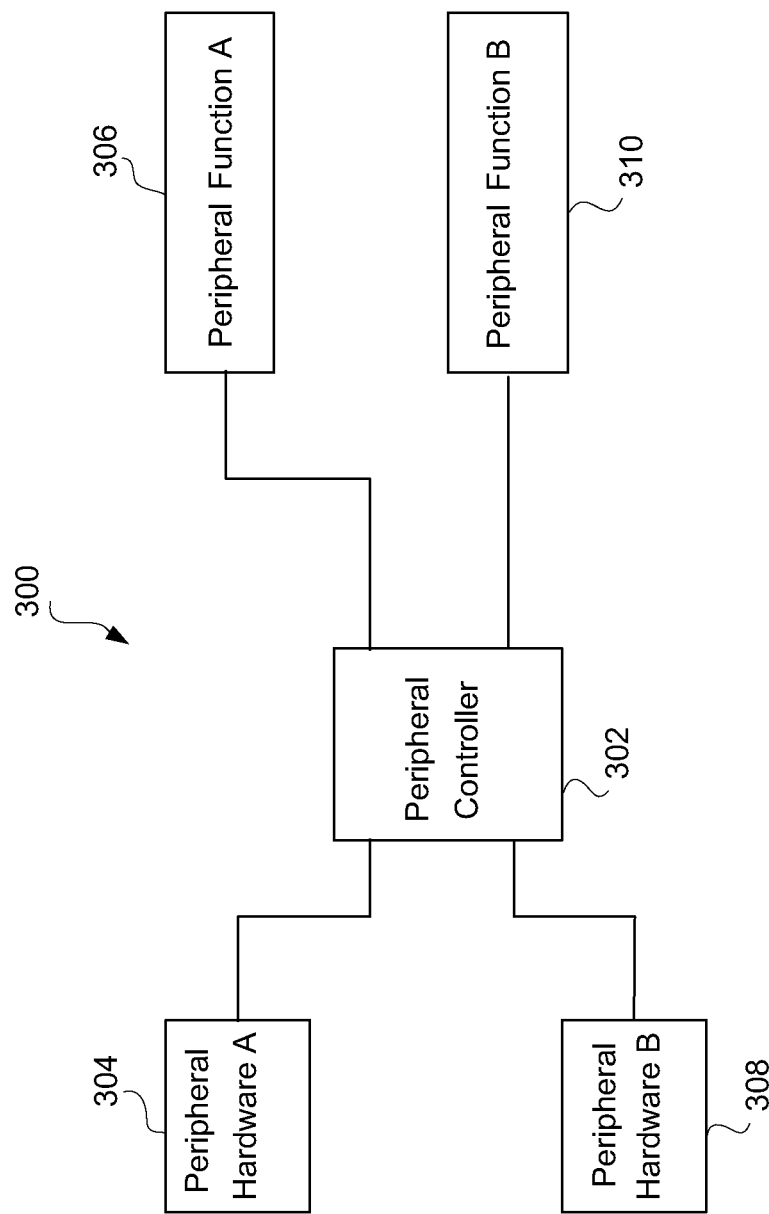

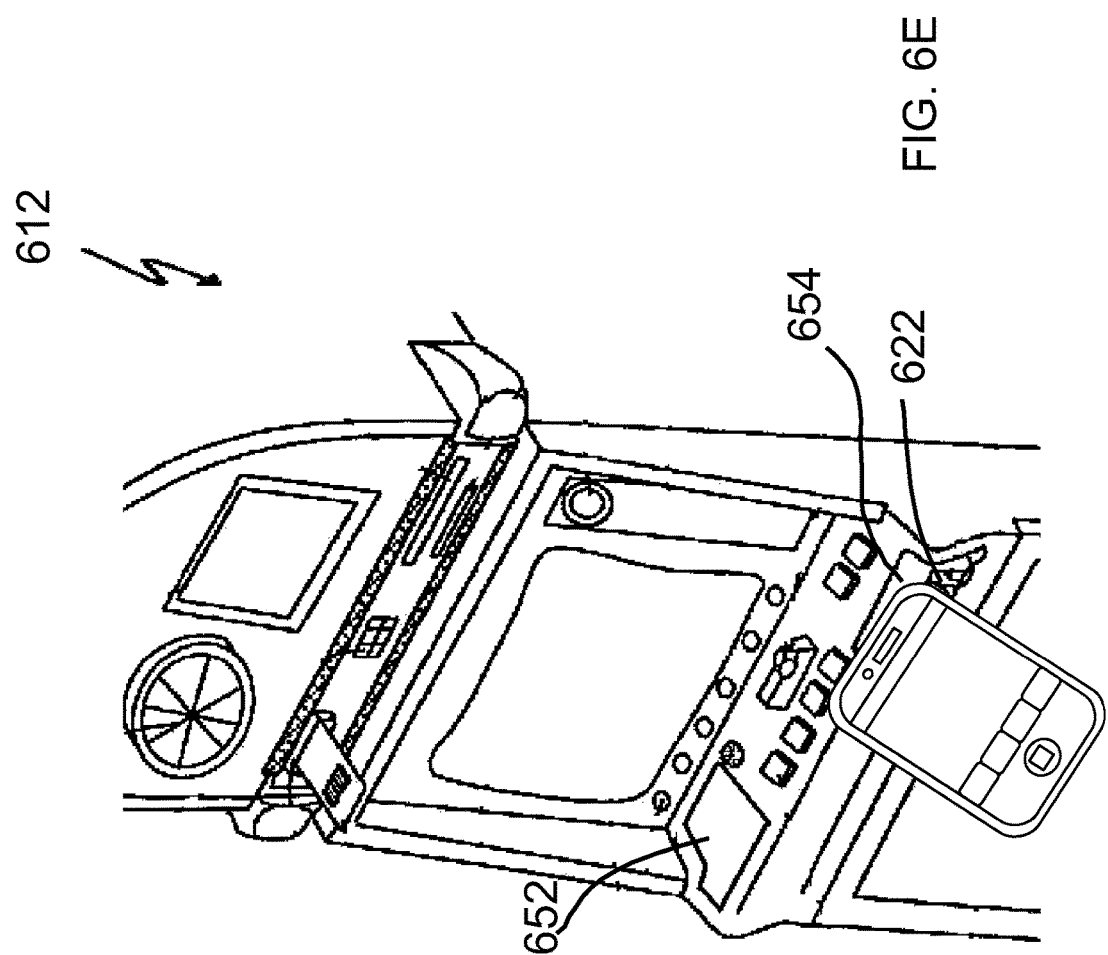

MULTI-FUNCTIONAL PERIPHERAL DEVICE

FIELD OF INVENTION

The present disclosure relates generally to multi-functional peripheral devices. More particularly, the present disclosure relates generally to using the multi-functional peripheral devices in a gaming environment. Even more particularly, the present disclosure relates generally to using the multi-functional peripheral devices in a gaming environment to transfer funds.

BACKGROUND OF INVENTION

Portable electronic devices represent an alternative means to desktop computers to allow users to more conveniently interact with a variety of multimedia services. For example, many portable electronic devices may be configured to allow for the user to interact with multimedia services, messaging services, internet browsing services, telephone services, and the like. Furthermore, the software of portable electronic device may be configured to be updated so as allow for the presentation of additional multimedia services or applications. Portable electronic devices may also be configured to have wireless transmission and receiving capabilities so as to permit communication with one or more other sources.

Gaming machines may comprise any number of peripheral devices associated with the act of playing a game of chance. For example, peripheral devices such as a display, bill acceptor, keypad, ticket printer, and user input switches may be used to play a game of chance. Gaming establishments are always looking for new ways and/or gaming options to attract players to increase profits. However, presenting new services on gaming machines may be costly, time-consuming, and generally undesirable for many casinos owners for numerous reasons such as regulatory requirements, maintenance, and the like.

SUMMARY

The disclosure describes a system, apparatus, and method for communicating information between a gaming device and a portable electronic device using a multi-functional peripheral device associated with the gaming device. The multi-functional peripheral device may include a sensor to detect sensory input from the user and/or the portable electronic device associated with the user to play a game of chance on the gaming device.

In one embodiment, a multi-functional peripheral device may have at least one sensor device configured to detect at least one sensory input, a memory having at least one money transfer program configured to wirelessly transfer funds, a wireless interface configured to communicate with a portable electronic device, and a processor configured to execute the at least one money transfer program according to the sensory input received by the at least one sensor device. The at least one money transfer program may be configured to wirelessly transfer funds between the portable electronic device and a gaming device.

In one embodiment, a system to transfer funds in a gaming environment may include a portable electronic device having: (i) a first memory having a first money transfer program configured to wirelessly transfer funds; and (ii) a first processor configured to execute the first money transfer program. The first money transfer program may be configured to transmit a request to accept funds, and the request to accept funds may include a fund amount. The system may also have a multi-functional peripheral device having: (i) at least one sensor device configured to detect at least one sensory input from the portable electronic device; (ii) a second memory having a second money transfer program configured to wirelessly transfer funds; and (iii) a second processor configured to receive the request to accept funds from the portable electronic device and execute the second money transfer program based on the detected at least one sensory input.

In one embodiment, a method for transferring funds using a multi-functional peripheral device housed within a gaming device may include: receiving, at the multi-functional peripheral device, at least one sensory input from a portable electronic device; determining whether to initiate a transfer of funds to or from the gaming device based on the at least one sensory input, the transfer of funds including a fund amount; and transferring funds from the portable electronic device to the gaming device via the multi-functional peripheral device if it is determined that the transfer of funds to the gaming device is to be initiated. The fund amount may be used to play a game of chance on the gaming device.

In one embodiment, a bill acceptor to communicate with a gaming device may have at least one sensory device configured to receive at least one sensory input, a memory having at least one money transfer program configured to execute a wireless transfer of funds, and a processor configured to detect the at least one sensory input from the at least one sensor device and to operate the at least one money transfer program to initiate the wireless transfer of funds if the at least one sensory input has been detected. The sensory input may be received from a portable electronic device and the wireless transfer of funds may occur between the portable electronic device and the gaming device via the at least one money transfer program.

BRIEF DESCRIPTION OF THE DRAWINGS

The accompanying drawings, which are incorporated into and constitute a part of this specification, illustrate one or more example embodiments and, together with the description of example embodiments, serve to explain the principles and implementations.

In the drawings:

FIGS. 3A and 3B illustrate example block diagrams of a multifunctional peripheral device.

FIGS. 6A-6G illustrate exemplary graphical user interfaces of a portable electronic device for communicating with a gaming machine.

DESCRIPTION

Embodiments are described herein in the context of a multi-functional peripheral device. The following detailed description is illustrative only and is not intended to be in any way limiting. Other embodiments will readily suggest themselves to such skilled persons having the benefit of this disclosure. Reference will now be made in detail to implementations as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with one or more embodiments, the components, process steps, and/or data structures may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

The disclosure describes a system, apparatus, and method for communicating information between a gaming device and a portable electronic device using a multi-functional peripheral device associated with the gaming device. The multi-functional peripheral device may include a sensor to detect sensory input from the user and/or the portable electronic device associated with the user to play a game of chance on the gaming device.

Figure 1:
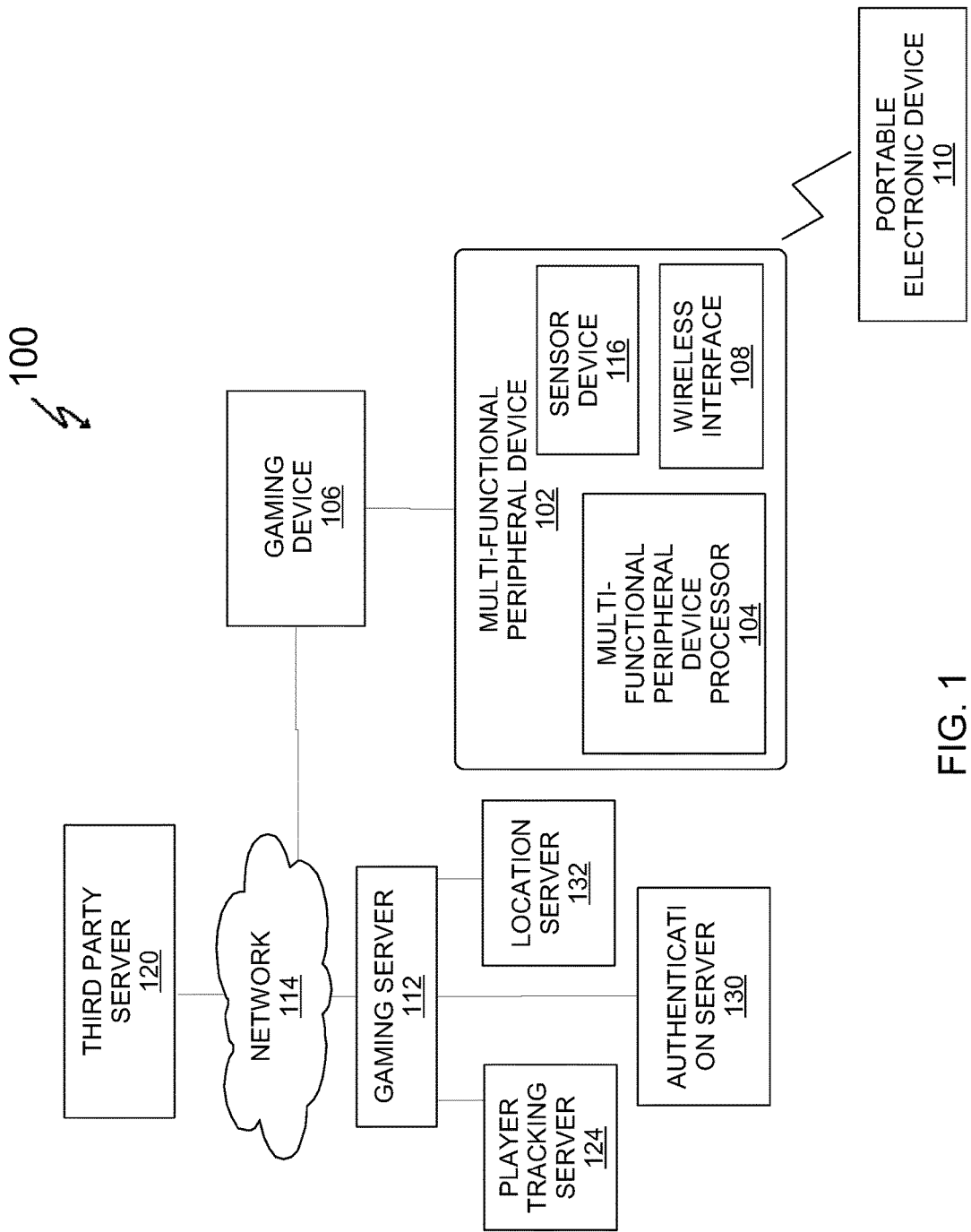
FIG. 1 illustrates an embodiment of a system for using a multi-functional peripheral device in a gaming environment.

FIG. 1 illustrates an embodiment of a system for using a multi-functional peripheral device in a gaming environment. Although described with use in a gaming environment, this is not intended to be limiting as the multi-functional peripheral device may be used in other environments such as in grocery stores, banks, merchant stores, and the like. The system 100 may include a multi-functional peripheral device 102 associated with a gaming device 106. The multi-functional peripheral device may have a multi-functional peripheral device processor 104 and at least one sensor device 116. The multi-functional peripheral device 102 may be configured to communicate with at least one portable electronic device 110 via wireless interface 108. The gaming device 106 may be configured to communicate with a gaming server 112 via network 114. Although illustrated with one gaming device 106 and one portable electronic device 110, this is not intended to be limiting as any number of gaming machines and portable electronic devices may be used.

Typically, the multi-functional peripheral device 102 serves as a peripheral device for gaming machine or device 106. The multi-functional peripheral device 102 can include a multi-functional peripheral device controller 104 that is configured to control operation of the multi-functional peripheral device 106. In one embodiment, the multi-functional peripheral device 102 supports not only a base peripheral function but also one or more additional peripheral functions. The multi-functional peripheral device 102 can thus be used to replace an existing peripheral device and can serve to provide additional capabilities beyond that available in the existing peripheral device, as further described with reference to FIGS. 3A and 3B.

The multi-functional device 102 may have at least one sensor device 116 configured to receive and/or detect at least one sensory input by portable electronic device 110. The at least one sensory device 116 may be any known device configured to detect and/or receive a sensory input. For example, the at least one sensor device 116 may be an accelerometer, camera, microphone, touchpad, retina scanner, radio frequency identification reader, near-field magnetic reader, or any other device capable of receiving and detecting sensory input.

The sensory input may be any type of known sensory input such as an audio, visual, and/or physical contact received from a user. The type of sensory input received or detected may be based on the sensory device. For example, a user may physically contact the sensor device 116 via a tap, touch, or any other physical contact on a touchpad. The physical contact may initiated by the user (e.g. using a finger to tap the sensor device 116), physical object (e.g. pen, coin, and the like), and/or a remote device associated with the user. The remote device may, for example, be any portable computing device such as a cellular phone, portable media player, personal digital assistant (PDA), and the like. In another embodiment, the sensory input may be an audio input received by a microphone associated with the multi-functional peripheral device 102.

In general, the sensory input may need to be in close proximity to the sensory device for transmission. For example, a user's voice may be in close to the microphone in order for the sensory input (i.e. user's voice) to be received by the microphone. In another example, a user's touch may need to physically contact the touchpad, a tap may need to vibrate an accelerometer, a player gesture may need to be in the camera's focus in order to be received by the camera, and the like. This type of proximity sensing may be desired for secured transactions (e.g. logging in to a player's account, funds transfer, authentication, and the like).

The sensor device 116 may detect the sensory input and transmit a notification of the sensory input to the multi-functional peripheral device processor 104. In one embodiment, multi-functional peripheral device 102 may also receive a transmission from the portable electronic device 110 via wireless interface 108. Wireless interface 108 may be any known wireless methods or device such as a 3G wireless technology, 4G wireless technology, Bluetooth, Wireless USB, Near-field magnetic, Fire Wire, WiMax, IEEE 802.11 technology, radio frequency, and the like.

The transmission may be contextual based and associated with or correspond to the sensory input received by the multi-functional peripheral device 102. For example, if the sensory input was received in the context of playing a game of chance on the gaming machine, the transmission may correspond to an action to play the gamine of chance, such as cashing out, dealing, playing a maximum bet, and the like. In another example, if the sensory input was received in the context of transferring funds, the transmission may be a confirmation to transfer the funds to the gaming machine. In still another embodiment, if the sensory input was received in the context of gaming establishment services, the transmission may be a reservation request for a table in a restaurant, a seat in a tournament, or a request to buy tickets to watch a movie.

Gaming server may 112 may be configured to communicate with player tracking server 124, location server 132, and authentication server 130. In one embodiment, player tracking server 124 may be configured to collect player data as well as determine the location of a customer within a gaming environment. Player tracking sever 124 may have a database configured to store player tracking information such as name, games the player likes to play, accumulated and used points, number of wins and losses, and the like. Player tracking server 124 may also be configured to store the location of all gaming machines within the gaming environment such that if a player inputs their player tracking card in a gaming machine, the player's gaming activities as well as the location of the player may be tracked.

In another embodiment, if the player is an anonymous player, location server 132, may be used to locate the location of the player in the gaming environment and assign an arbitrary identification (ID) to the anonymous player. Whether the player is an anonymous player or a player having a player tracking account, server 132 may include a database containing the location of all gaming devices (stationary and mobile gaming devices) in the gaming environment. Location server 132 may locate players within the gaming environment using any known wireless location methods such as global positioning systems (GPS), indoor Wi-Fi triangulations, and the like. In one embodiment, location server 132 may be configured to locate the position of the player using the player's portable electronic device 110 and the location of the nearest gaming device 106. In another embodiment, the location server 132 may be configured to locate the player in the gaming environment using only the player's portable electronic device 110.

Authentication server 130 may be used to authenticate and/or verify the player, gaming device 106, and/or the portable electronic device 110. Any known authentication methods may be used, such as public-private key authentication algorithms, random number generators, authentication keys, and the like, as further discussed below.

In one embodiment, authentication server 130 may have a memory (not shown) having a location verification program configured to conduct verification and/or authorization for gaming and non-gaming activities, such as to authorize a funds transfer request based upon the location of the gaming devices. Memory may also have a rules database configured to store a plurality of local jurisdictional gaming rules. Authentication server 132 may be configured to communicate with location server 132 to obtain the location of all gaming devices (stationary and mobile gaming devices) in the gaming environment. Based upon the location of the gaming devices, authentication server 132 may determine if the tracked location of the portable electronic device and the multi-functional peripheral device conflict with at least one of the plurality of jurisdictional gaming rules. If authentication server 132 determines that the tracked location of the portable electronic device and the multi-functional peripheral device conflicts with at least one of the plurality of jurisdictional gaming rules, the funds transfer request (or any other request) may be disallowed. If authentication server 132 determines that the tracked location of the portable electronic device and the multi-functional peripheral device do not conflict with at least one of the plurality of jurisdictional gaming rules, the funds transfer request (or any other request) may be allowed. For example, some local state rules may only allow the maximum transfer of $100.00 to a gaming machine. Authentication server may receive a funds transfer request for $150.00. Since the funds transfer request is greater than the $100 maximum transfer limit, the authentication server may disallow the funds transfer request.

Gaming device 106, gaming server 112, and/or multi-functional peripheral device 102 may also be configured to communicate with a third party server 120. Third party server 120 may be any server necessary to carry out, assist, or perform the at least one request received by the portable electronic device such as a banking server, merchant server, credit card server, advertisement server, and the like. For example, if the request received by the multi-functional peripheral device 102 is a request to transfer funds from a player's bank account to the gaming device 106, third party server 120 may be the player's banking server. In another example, if the request received by the multi-functional peripheral device 102 is a request to charge $100 to the player's credit card. The third party server 120 may be a credit card server. In still another example, if the request received by the multi-functional peripheral device 102 is a request to debit a merchant card, such as a gift card, the third party server 120 may be a merchant server.

Figure 2A:
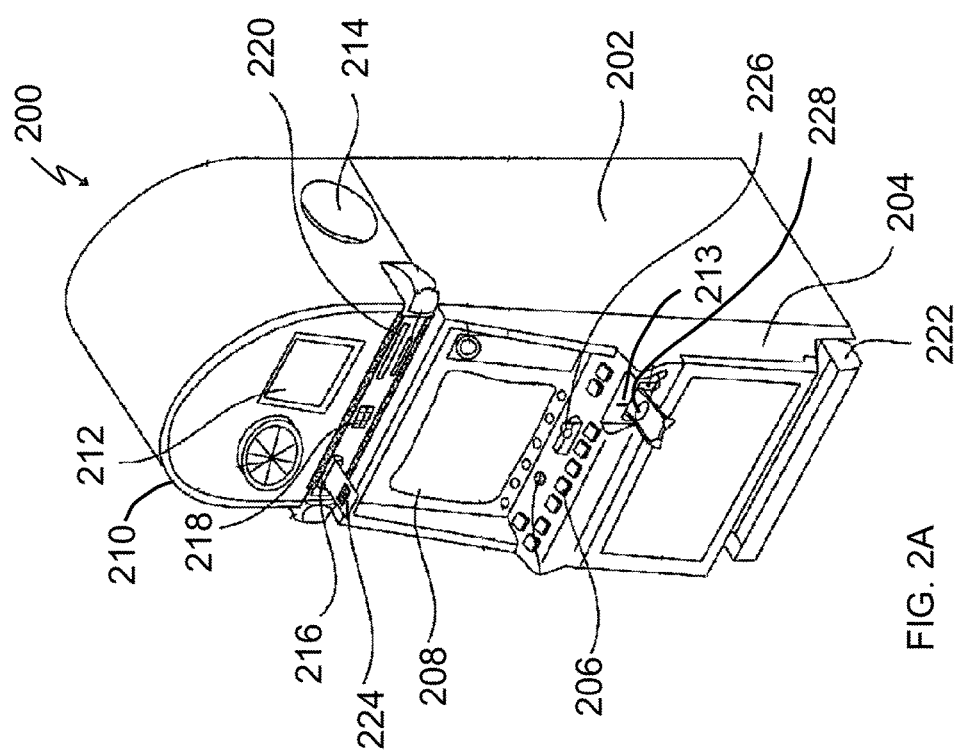
FIGS. 2A and 2B illustrate example gaming machines.

FIG. 2A illustrates a perspective view of an example gaming machine. The gaming machine 200 may include a main cabinet 202. The main cabinet 202 may include a main door 204, which may be configured to open to provide access to the interior of the gaming machine. The main door 204 may have a plurality of peripheral devices. The plurality of peripheral devices may include at least one button or switch 206 configured to receive player input or command, a display 208, a secondary display 212, speaker 214, a ticket printer 216, a keypad 218 for entering player tracking information, a player tracking device 220, a coin acceptor 226, and a multi-functional peripheral device 228 including at least one sensor device 213. The gaming machine 200 may be configured to display a game of chance on display 208 and/or secondary display 212. The game of chance may be any game of chance, including but not limited to, video poker, video blackjack, video keno, video slot games, and any other theme. Although illustrated as a stationary physical slot machine, a gaming device can also be a portable electronic device such as a smart phone, a tablet computer, a personal digital assistant (PDA), a laptop computer, a handheld media player, a table game, and the like.

Player inputs may be detected from the at least one button or switch 206. When selected, the gaming machine may detect the input and transmit the input to the gaming machine processor. For example, the button 206 may be used to increase or decrease a betting amount. In another embodiment, display 208 may be a touch screen display such that the user may input selections via display 208. Display 208 may be, for example, one of a cathode ray tube, high resolution flat-panel liquid crystal display ("LCD"), a plasma display, a light-emitting diode ("LED") display, or any other monitor and/or display configured to present information and/or allow the user to play a game of chance. The video display 208 may include one or more display windows to allow for multiple games or multiple services to be provided simultaneously to a user.

The top box 210 may be designed to house a plurality of peripheral devices, including but not limited to the secondary display 212 and speakers 214. During certain gaming events, the gaming machine 200 may be configured to display a plurality of visual and auditory effects that are perceivable by the user. Such visual effects may be displayed via the video display 208 and the secondary display 212. The plurality of auditory and visual effects may serve to enhance the user's experience during game play. The secondary display 212 may be, for example, a cathode ray tube, high resolution flat-panel LCD, a plasma display, an LED display, or any other monitor and/or display configured to present information and/or allow the user to play a game of chance. The secondary display 212 may be configured to present a bonus game, services, video player, tournaments, move times, or any other information. Audio effects may be presented via the speakers 214.

The main cabinet 202 may include the ticket printer 216 configured to print an electronically-readable ticket 224, keypad 218 for entering player tracking information, the player tracking device 220, the coin tray 222, the coin acceptor 226, and the multi-functional peripheral device 228. Following a completion of a gaming session, the ticket printer 216 may be configured to print an electronically-readable ticket 224. The electronically-readable ticket 224 provides one means of dispensing currency to the player when they are ready to "cash out". The electronically-readable ticket 224 may also include information relating to the gaming session, including a cash-out amount, a validation number, a gaming venue, a print date and time, gaming machine identification (ID) number, or any other relevant content.

The surface of the electronically-readable ticket 224 may also include a bar code. When the electronically-readable ticket 224 is inserted into a gaming machine, the bar code may be read and processed by another gaming machine so as to derive relevant content related to a prior gaming session. The electronically-readable ticket 224 may be either accepted by the multi-functional peripheral device 228 so as to add previously accumulated credits of another gaming machine to the existing credits or the electronically-readable ticket 224 may be exchanged for cash.

The multi-functional peripheral device 228 may be configured to perform a plurality of gaming and non-gaming functions. In one embodiment, the multi-functional peripheral device 228 may be configured to control and command and/or request the printer to print the electronically-readable ticket 224. In one example, the multi-functional device 228 may include a printer to print the electrically-readable ticket. In another embodiment, the multi-functional peripheral device 228 may be configured to accept cash of a variety of currency or denomination as well as the electronically-readable ticket 224 having a cash value. In another example, the multi-functional device may be used to authenticate the user, conduct social networking functions, act as a wireless communication gateway with portable electronic devices, transfer funds, and other gaming or non-gaming activities or functions.

The multi-functional peripheral device 228 may have at least one sensor device 213. The at least one sensor device 213 can be any device that can detect a sensory input from a user. The at least one sensor device may be an accelerometer, a camera, a microphone, a touchpad, a touch screen, radio frequency identification reader, near-field magnetic reader, and the like. The at least one sensor device 213 may be configured to communicate with a processor of the multi-functional peripheral device 228. In one example, the sensory input may be a predefined user action that may be associated with a gaming or non-gaming function. For example, a sensory input for one tap on a touch pad may be associated with a request to transfer funds. In another example, a sensory input for two taps on a touch pad may be associated with a "Hit" request while playing a video black jack game of chance. In still another example, a sensory input of one tap detected by an accelerometer may be associated with a confirmation to cash out of the gaming machine. It will now be known that many other combinations and/or predefined actions may be possible and are contemplated.

The secondary display 212, the keypad 218, and the player tracking device 220 may, in conjunction, comprise a player tracking service to provide for the accurate recording of information obtained during the gaming session. The player tracking service may display information relevant to the player's preferences as based on the recorded information on the secondary display 212. The player tracking service may be initiated when a magnetic striped card containing player tracking information is inserted into the player tracking device 220 and a personal identification number (PIN) is entered using the keypad 218. During the player tracking session, commands made by the player may be recorded such as in a memory (e.g. non-volatile random access memory (NVRAM), flash memory, dynamic random access memory ("DRAM")) on the gaming machine, player tracking server, or in any other data storage device. For example, during the player tracking session, the player tracking software may monitor the amount of time and activity that the player spends at a particular gaming machine, derive timely and accurate marketing information, and subsequently present commercialization opportunities based on that player's gaming preferences.

Figure 2B:
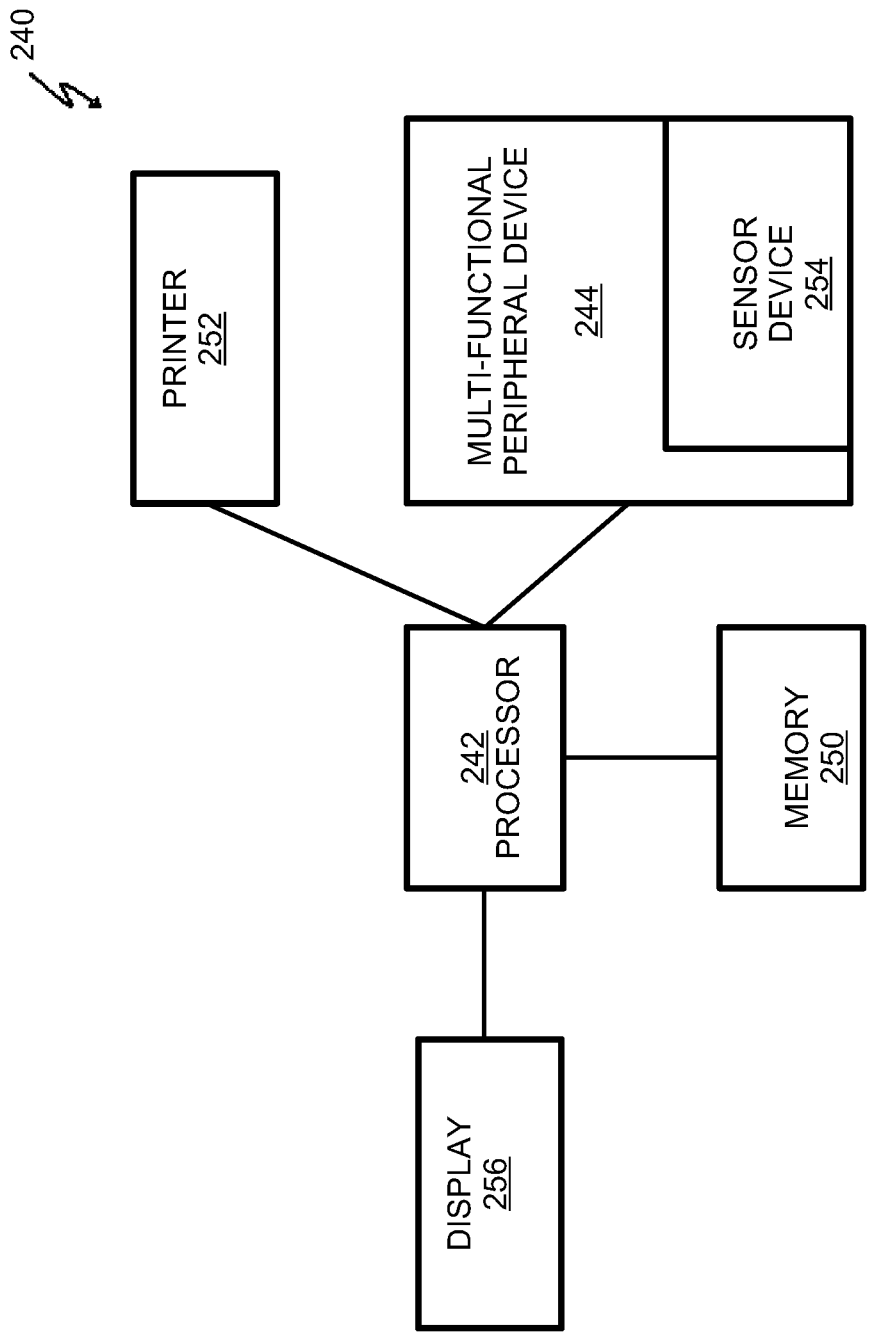

FIG. 2B illustrates an example block diagram of a gaming device. The gaming device 240 can have a processor 242 configured to communicate with a multi-functional peripheral device 244, a memory 250, a printer 252, and a display 256. Although illustrated with specific components, this is not intended to be limiting as any other components may be used, such as an informational display, secondary display, progressive meters, human interface devices, camera, microphone, player tracking device, bill acceptor, and the like.

The multi-functional peripheral device 244 may have at least one sensor device 254. The at least one sensor device 254 can be any device that can detect a sensory input from a user. The at least one sensor device may be an accelerometer, a camera, a microphone, a touchpad, a touch screen, radio frequency identification reader, near-field magnetic reader, fingerprint reader, and the like. The at least one sensor device 254 may be configured to communicate with a processor of the multi-functional peripheral device 244. In one example, the sensory input may be a predefined user action that may be associated with a gaming or non-gaming function. For example, a sensory input for one tap on a touch pad may be associated with a request to transfer funds. In another example, a sensory input for two taps on a touch pad may be associated with a "Hit" request while playing a video black jack game of chance. In still another example, a sensory input of one tap detected by an accelerometer may be associated with a confirmation to cash out of the gaming machine. It will now be known that many other combinations and/or predefined actions may be possible and are contemplated.

Display 256 may be a touch screen display such that the user may input selections via display 256. Display 256 may be display 212 or 208 as illustrated in FIG. 2A. Display may be any type of display configured to present or display information, data, a game of chance, or the like. For example, display may be one of a cathode ray tube, high resolution flat-panel liquid crystal display ("LCD"), a plasma display, a light-emitting diode ("LED") display, or any other monitor and/or display configured to present information and/or allow the user to play a game of chance. The video display 250 may include one or more display windows to allow for multiple games or multiple services to be provided simultaneously to a user.

Memory 250 may be type of memory capable of storing data such as game data, game play information, paytables, and the like. Memory 250 may be any type of memory such as dynamic random access memory (DRAM), flash memory, non-volatile random access memory (NVRAM), and the like. Printer 252 may be any type of printer capable of providing receipts, electronically-readable tickets, and the like.

Figure 3B:
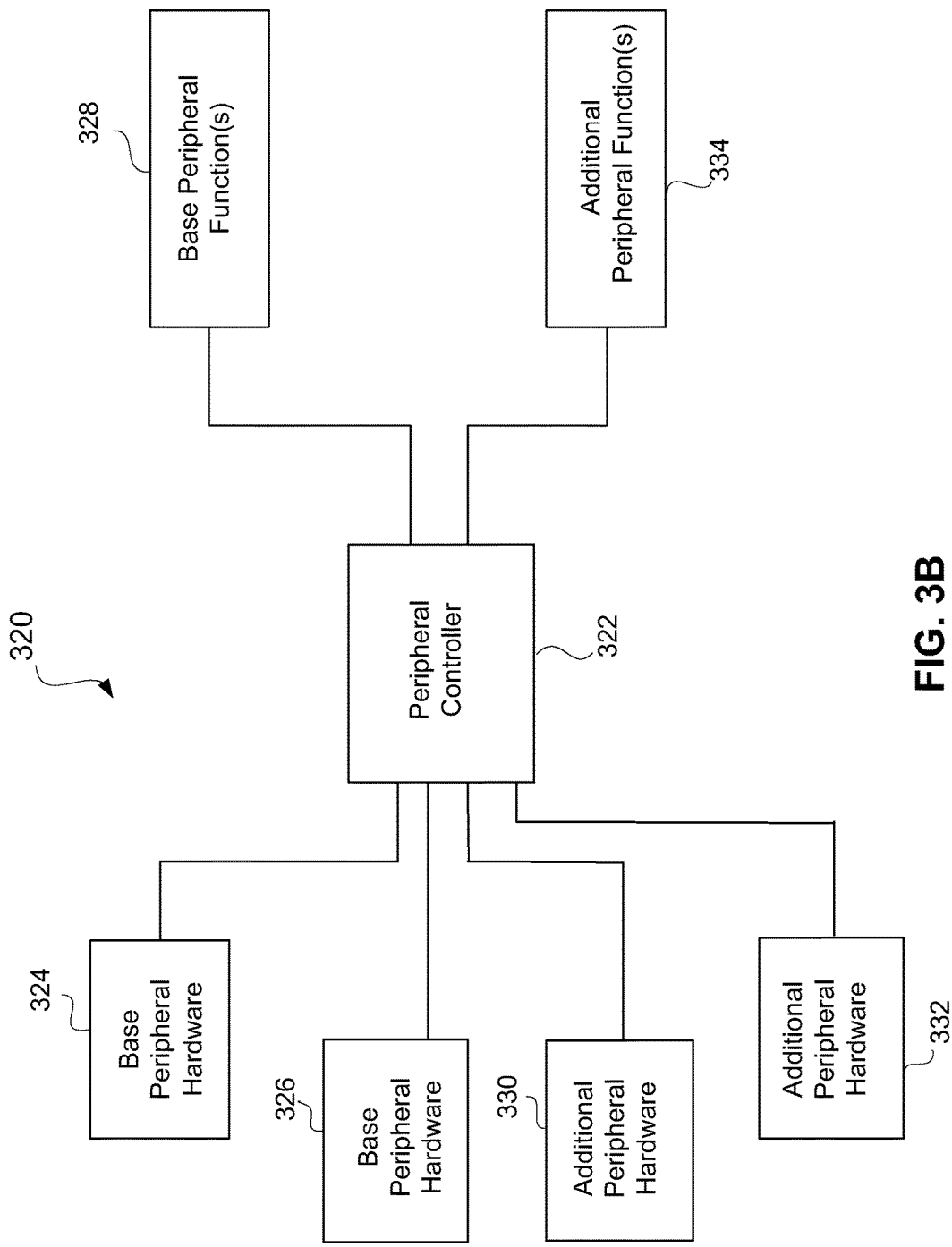

FIGS. 3A and 3B illustrate example block diagrams of a multifunctional peripheral device. Referring to FIG. 3A, typically, the multi-functional peripheral device 300 serves as a peripheral device for a gaming machine. The multi-functional peripheral device 300 can include a peripheral controller 302 that is configured to control operation of the multi-functional peripheral device 300. The peripheral controller 302 can be coupled to peripheral hardware A 304 and a peripheral function A 306. The peripheral controller 302 can also be coupled to peripheral hardware B 308 and a peripheral function B 310. In one implementation, the multi-functional peripheral device 300 supports two primary functions, such as a first primary function and a second primary function. The peripheral hardware A 304 and the peripheral function A 306 can be used by the first primary function, while the peripheral hardware B 308 and the peripheral function B 310 can be used by the second primary function.

Often, a gaming machine can include one or more integrated single function peripherals, such as a bill acceptor, a player tracking peripheral, a voucher printer, camera, touch screen, sensory input device (e.g., motion sensor, accelerometer, and the like), user input devices (e.g., buttons and switches), and any other single function peripheral devices. In a multi-functional peripheral device 300, the multiple functions can be consolidated in a single peripheral device. In the multi-functional peripheral device 300, the peripheral device is able to include functionality to operate as two or more function peripherals. As one example, the multi-functional peripheral 300 can provide player tracking and a camera (e.g., for user detection, user authentication, user input, such as gesture recognition, and other gaming or non-gaming functions). As another example, the multi-functional peripheral 300 can provide bill acceptance capabilities and a sensory input device (e.g., accelerometer, camera, touchpad, and the like). In yet another embodiment, the multi-functional peripheral 300 can provide credit/debit/cash card reading and electronic signature capability. In still another embodiment, a multi-functional peripheral can provide bill acceptance capabilities and voucher printing.

In one embodiment, the multi-functional peripheral device 300 can serve as a peripheral that is added to a gaming machine. The multi-function peripheral device 300 can also replace a legacy peripheral device such as the prevalent single-function bill acceptor, player tracking unit, printer, and any other peripheral device. The multi-functional peripheral device 300 can be integrated with the gaming machine or can be external but connected to the gaming machine via any wired or wireless methods such as such as universal serial bus, Ethernet, Serial Advanced Technology Attachment (SATA), 3rd Generation ("3G") wireless technology, 4th Generation ("4G") wireless technology, Fire Wire, Worldwide Interoperability for Microwave Access ("WiMax"), IEEE 802.11 technology, Near-Field Magnetic Network, radio frequency, and the like.

As previously noted, a multi-functional peripheral device can be a peripheral for a gaming machine. The multi-functional peripheral device can be either a new peripheral device or a replacement peripheral device. When the multi-functional peripheral device is a replacement peripheral device, the multi-functional peripheral device typically includes not only the peripheral function of a peripheral device being replaced but also a least one new peripheral function. Although discussed with use in a gaming machine, this is not intended to be limiting as multi-functional peripheral device may be used in other technologies and fields such as a banking machine, drink and snack machines, and the like.

FIG. 3B is a block diagram of a multi-functional peripheral device 320 according to another embodiment. Typically, the multi-functional peripheral device 320 serves as a peripheral device for a gaming machine. The multi-functional peripheral device 320 can include a peripheral controller 322 that is configured to control operation of the multi-functional peripheral device 320. The peripheral controller 322 can be coupled to base peripheral hardware 324 and 326, and a base peripheral function(s) 328. In one implementation, the multi-functional peripheral device 320 supports not only a base peripheral function but also one or more additional peripheral functions. To support at least one additional function, the multi-functional peripheral device 320 can also include additional peripheral hardware 330 and 332, and additional peripheral function(s) 334. The peripheral controller 322 can also be coupled to additional peripheral hardware 330, additional peripheral hardware 332, and to additional peripheral function(s) 334.

The multi-functional peripheral device 320 can thus be used to replace an existing peripheral device. Here, the base peripheral hardware 324 and 326 and the base peripheral function(s) 328 can serve to enable the multi-functional peripheral device 320 to in effect provide (at least) the same capabilities as the existing peripheral device. Moreover, the additional peripheral hardware 330 and 332 and the additional peripheral function(s) 334 can serve to provide the multi-functional peripheral device 320 with additional capabilities beyond that available in the existing peripheral device. In one implementation, the multi-functional peripheral device 320 can have the same form factor as the existing peripheral device so that the multi-functional peripheral device 320 is conveniently able to be swapped for the existing peripheral device.

Figure 4A:
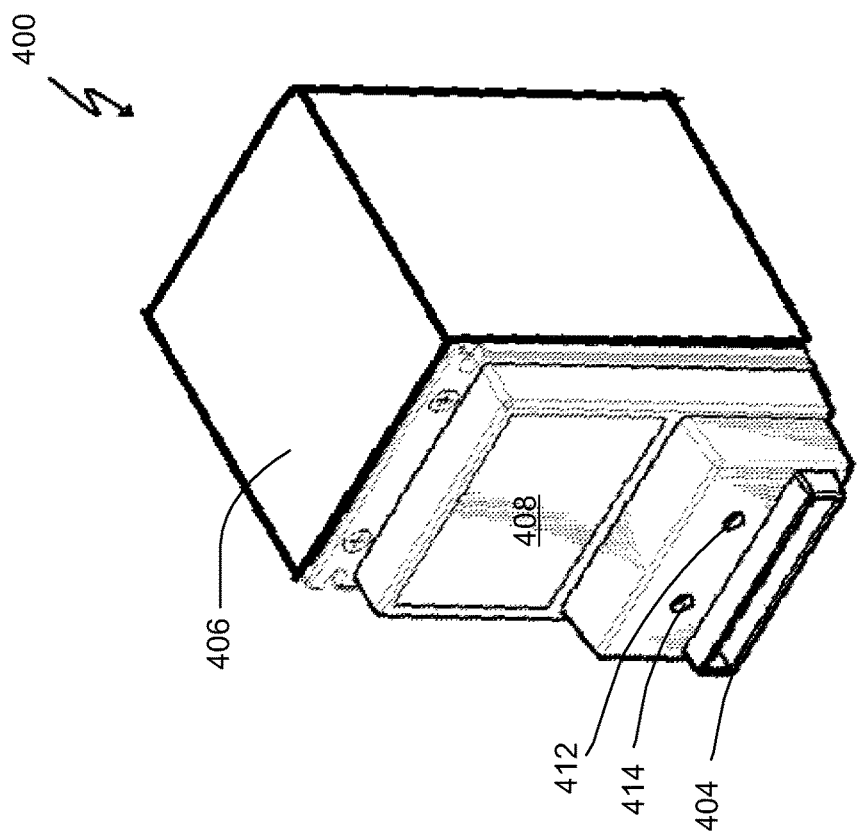
FIGS. 4A-4B illustrate an embodiment of a multi-functional peripheral device.
Figure 4B:
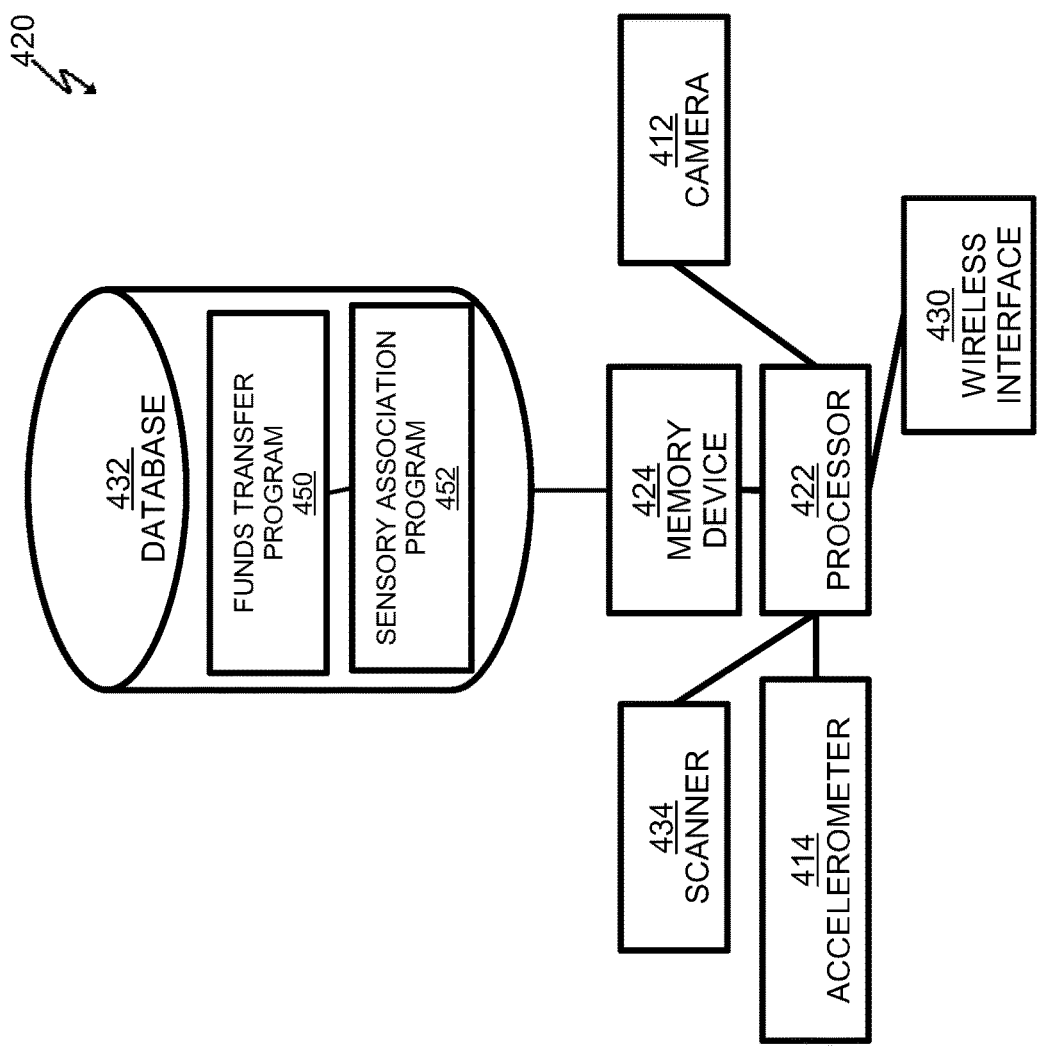

FIGS. 4A-4B illustrate an embodiment of a multi-functional peripheral device. FIG. 4A illustrates a perspective view of an example multi-functional peripheral device. In one embodiment, as illustrated, the multi-functional peripheral device may be a bill acceptor. The multi-functional peripheral device may be in cased in a housing 406 to encase at least one sensory device such as an accelerometer 414, a camera 412, and a value receiving device 404. The multi-functional peripheral device may also have at least one display 408 to display information and data to the user. Although illustrated with three sensor devices, this is not intended to be limiting as any number and/or types of sensor device may be used such as a microphone, touchpad, retina scanner, radio frequency identification reader, near-field magnetic reader, or any other device capable of receiving and detecting sensory input. For instance, the touchpad could be integrated to give the bill acceptor electronic signature capturing capability.

Display 408 may be any type of display configured to present or display information, data, instructions, successful or error notifications, transferred fund amounts, and the like. Display may be one of a cathode ray tube, high resolution flat-panel LCD, a plasma display, an LED display, touch screen, or any other similar type of display. In one example, display 408 may present gaming and non-gaming related events and promotions offered by a gaming establishment such as future contests, tournaments, restaurant specials, discounts at stores, and the like. Display 408 may further include a touchscreen to capture player inputs.

Value receiving device 404 may be configured to accept multiple forms of credit. For example, value receiving device 404 may be configured to accept monetary bills of varying currency, types, and denominations, credit cards, cash cards, electronically-readable tickets, and the like. In one embodiment, value receiving device 404 may include a scanner (e.g. scanner 434 as illustrated in FIG. 4B) to detect the currency, credit card, and/or tickets. In another embodiment, value receiving device 404 may include a card reader to read smartcards, magnetic stripe cards, RFID cards, near-field magnetic cards, and the like.

The camera 412 may be any device capable of capture images and video. In one embodiment, the camera 412 may allow the multi-functional device 400 to authenticate a user or portable electronic device, assist a player to play a game of chance on the gaming device, conduct video conferencing, and perform other gaming or non-gaming functions. For example, the camera 412 may be a smart camera configured to conduct facial recognition of the player for authentication and/or verification purposes. For example, the camera 412 may take a picture of the player, which is transmitted to authentication server (e.g. authentication server 130 as illustrated in FIG. 1) from multi-functional peripheral device. Authentication server may then compare the picture with other pictures in its database for a match.

In another example, the camera may be used to assist the user to play a gaming of chance on the gaming machine. Camera 412 may detect user gestures which represent and/or are associated with at least one gaming function to play the game of chance. In one example, in a video black jack game, the user may move his hands horizontally to "Stand" or move his hands vertically to "Hit". The camera 412 may detect such sensory inputs and transmit them to the multi-functional peripheral device for processing.

An accelerometer 414 may be configured to detect sensory input. The accelerometer 414 may be any device used to detect movement, displacement, and the like such as a piezoelectric accelerometer, shear mode accelerometer, thermal accelerometer, bulk micro-machined capacitive accelerometer, capacitive spring mass base accelerometer, and the like. The accelerometer 414 may be configured to detect the sensory input and transmit notification of the input to the multi-functional peripheral device 400 for processing. In one example, the accelerometer may be configured to assist the user with a transfer of funds to or from the gaming machine as further described in detail with reference to FIGS. 6-9.

In another example, accelerometer may be configured to assist the user in playing a gaming of chance on the gaming machine. For example, accelerometer 414 may detect user gestures which represent and/or are associated with at least one gaming function to play the game of chance. In one example, in a video black jack game, the user may tap the accelerometer once to "Hit", twice to "Stand", and three times to "Double Down". The accelerometer 414 may detect such sensory inputs and transmit them to the multi-functional peripheral device for processing.

FIG. 4B Illustrates a block diagram of the multi-functional peripheral device illustrated in FIG. 4A. The multi-functional peripheral device 420 may have a processor 422 configured to communicate with at least one sensory device such as an accelerometer 414, a camera 412, and a scanner 434. Scanner 434 may be used in conjunction with value receiving device 404 illustrated in FIG. 4A.

Figure 5:
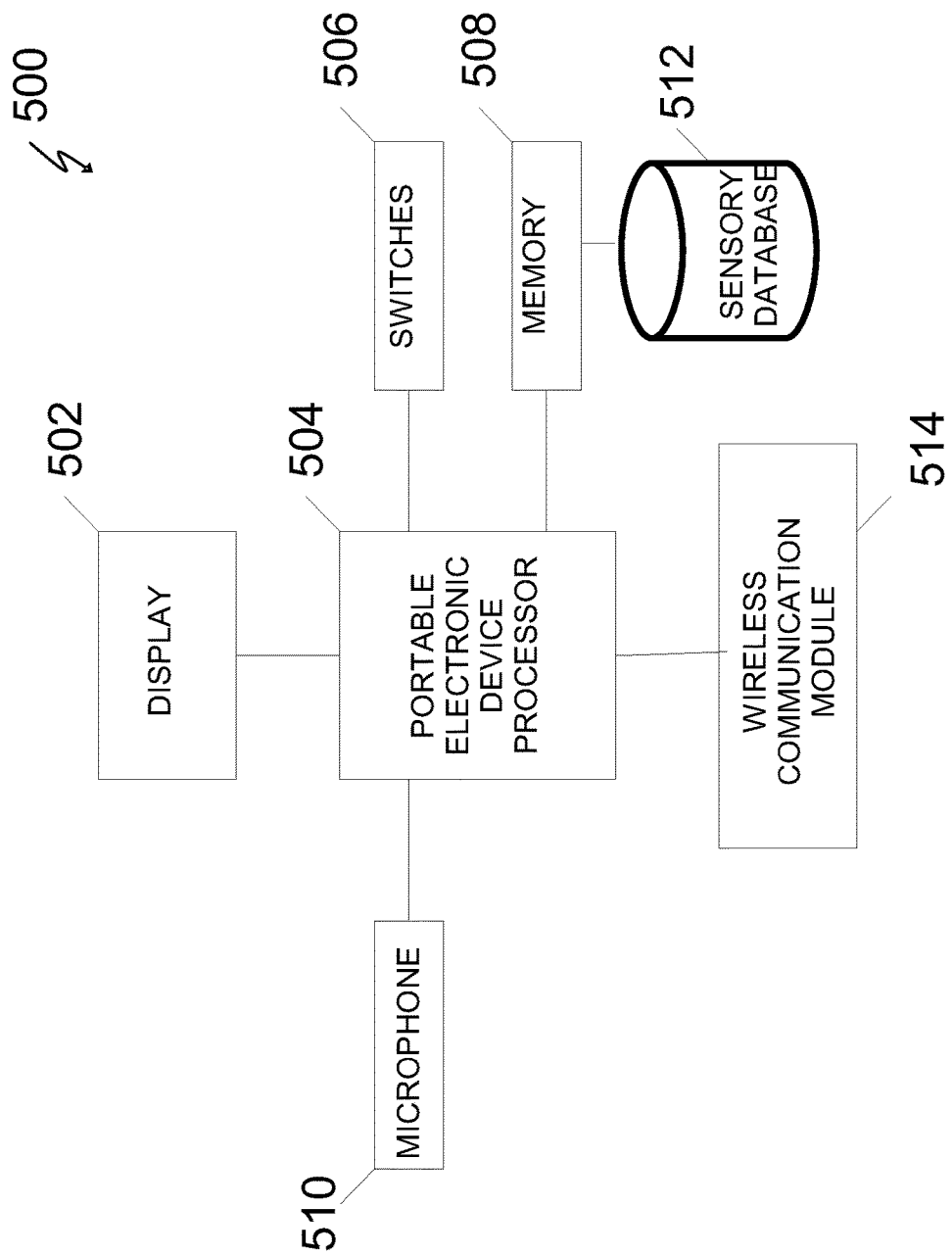
FIG. 5 illustrates an example block diagram of a portable electronic device.

The multi-functional peripheral device 420 may also have a wireless interface 430 configured to communicate with remote computing devices such as a portable electronic device (e.g. portable electronic device 110 illustrated in FIG. 1 and portable electronic device 500 illustrated in FIG. 5). Wireless interface may be any known wireless methods or device such as a 3G wireless technology, 4G wireless technology, Bluetooth, Wireless USB, Near-field magnetic, Fire Wire, WiMax, IEEE 802.11 technology, radio frequency, and the like.

Multi-functional peripheral device 420 may also have a memory 424 storing a database 432. Memory may be any memory configured to store information or data such as non-volatile random access memory (NVRAM), dynamic random access memory (DRAM), Ferroelectric Random Access Memory (FRAM), Electrically Erasable Programmable Read-Only Memory (E2PROM), flash memory, a disk drive, and the like.

Database may be configured to store data and software programs such as a funds transfer program 450, a sensory association program 452, and the like. Funds transfer program 450 may be configured to assist with the transfer of funds from or to the gaming machine by a portable electronic device as further described with reference to FIGS. 6-9. Sensory association program 452 may be configured to associate sensory input received by the at least one sensor device to a gaming or non-gaming function based on the context in which the sensory input is detected. For example, the multi-functional peripheral device may, simultaneously or in conjunction with the detection of the sensory input, receive a funds transfer request from the portable electronic device. Thus, a sensory input detection of one tap (e.g. an accelerometer associated with the multi-functional peripheral device may detect movement of one tap) may be associated with an initiation to transfer funds to a gaming machine in the context of a transfer of funds. In another example, a sensory input detection of two taps (e.g. a touch pad associated with the multi-functional peripheral device may detect movement of two taps) may be associated with an initiation to transfer funds from a gaming machine in the context of a transfer of funds—in other words, the player has completed playing the game of chance and would like to cash out his credits from the gaming machine.

In another example, the multi-functional peripheral device 420 may detect that the portable electronic device is being used as a remote device to play a game of video black jack on a gaming machine. If the processor 422 receives notification of a sensory input for two taps (e.g. the accelerometer 414 associated with the portable electronic device 420 may detect movement of two taps), the two taps may be associated with a "Hit" request in the context of playing a game of video black jack. Processor 422 may then prepare and transmit a hit request to the gaming machine.

FIG. 5 illustrates an example block diagram of a portable electronic device. The portable electronic device 500 may be any type of portable computing device. For example, portable electronic device 500 may be a cellular phone, portable media player, personal digital assistant (PDA), netbook, portable computer, electronic reader, and the like. Portable electronic device 500 may have a processor 504, display 502, memory 508, at least one user button or switch 506, sensor device 510 configured to receive any type of sensory input, and a wireless communication module 514. Although illustrated with specific components, this is not intended to be limiting as portable electronic device 500 may have other components such as an antenna, power source, speaker, camera, and the like.

Display 502 may be any type of display such as a touch screen display, LCD, plasma display, LED display, or any other monitor and/or display configured to present information and/or allow the user to play a game of chance. For example, display 502 may be configured to display a plurality of indicators (as discussed and illustrated in FIGS. 6A-6G). Each indicator may be associated with or correspond to one or more applications stored in the memory 508. Selection of one of the plurality of indicators may initiate the one or more applications. In one embodiment, display 502 may include a touch screen sensor such that the processor may be configured to detect a user selection of at least one of the indicators. In another embodiment, selection of one of the plurality of indicators may be made using switches 506.

Wireless communication module 514 may be configured to transmit and receive information or data from multi-functional peripheral device. Wireless communication module 514 may be any module capable of wireless transmission such as 3G wireless technology, 4G wireless technology, Bluetooth, wireless USB, wireless UWB), WiMAX, near field communication, radio frequency, and the like. In one embodiment, wireless communication module 514 may be configured to transmit gaming and non-gaming requests to the multi-functional peripheral device (e.g. multi-functional peripheral device 102 illustrated in FIG. 1 or multi-functional peripheral device 244 illustrated in FIG. 2B). For example, the portable electronic device may transmit a funds transfer request to transfer funds to the gaming machine to allow the player to play a game of chance on the gaming machine. In another embodiment, the portable electronic device may transmit a cash-out request to print an electronically-readable ticket on the printer of the gaming machine. In still another embodiment, the portable electronic device may transmit a reservation request to reserve a table at a restaurant at the gaming establishment.

The sensor device 510 can be any device that can detect a sensory input from a user. The at least one sensor device may be an accelerometer, a camera, a microphone, a touchpad, a touch screen, radio frequency identification reader, near-field magnetic reader, and the like. The sensor device 510 may be configured to communicate with the portable electronic device processor 504. In one example, the sensory input may be a predefined user action that may be associated with a gaming or non-gaming function. For example, a sensory input for one tap on a touch pad may be associated with a request to transfer funds. In another example, a sensory input for two taps on a touch pad may be associated with a "Hit" request while playing a video black jack game of chance. In still another example, a sensory input of one tap detected by an accelerometer may be associated with a confirmation to cash out of the gaming machine. It will now be known that many other combinations and/or predefined actions may be possible and are contemplated.

Portable electronic device 500 may have a memory 508 configured to store any type of information, data, and/or software to play a game of chance on a gaming machine and/or perform any other gaming functions such as checking a player tracking account, transferring funds to play the game of chance, and the like. Memory 508 may be any type of memory such as DRAM, NVRAM, Ferro-electric Random Access Memory (FRAM), Flash memory, Electrically Erasable Programmable Read-Only Memory (E2PROM), and the like.

In use, when processor 504 receives a notification of a sensory input from sensory device 510, processor 504 may determine what the user is requesting based on the associated function of the sensory input received. The sensory input may be a predefined user action that may be associated with a gaming or non-gaming function and may be context based. In one embodiment, processor 504 may be configured to communicate with memory 508, which may include a sensory database 512, to determine the function of the sensory input. In another embodiment, processor 504 may be configured to communicate directly with sensory database 512. Sensory database 512 may be configured to store information such as the type of sensory input detected, the function associated with the sensory input, and the context for which the sensory input was provided. For example, the user may have selected a "Transfer Funds" indicator on the portable electronic device. Thus, if the processor receives notification of a sensory input for one tap (e.g. the accelerometer associated with the portable electronic device 500 may detect movement of one tap), the one tap may be associated with an initiation to transfer funds to a gaming machine in the context of a transfer of funds. Processor 504 may then prepare and transmit a funds transfer request to the multi-functional peripheral device. The funds transfer request may include any information necessary to facilitate a transfer of funds such as a portable electronic device identifier, destination address (e.g. which gaming machine to transfer the funds to), amount of funds to be transferred, and the like.

In another example, portable electronic device 500 may be used as a remote device to play a game of video black jack on a gaming machine. If the processor receives notification of a sensory input for two taps (e.g. the accelerometer associated with the portable electronic device 500 may detect movement of two taps), the two taps may be associated with a "Hit" request in the context of playing a game of video black jack. Processor 504 may then prepare and transmit a hit request to the multi-functional peripheral device.

Figure 6A:
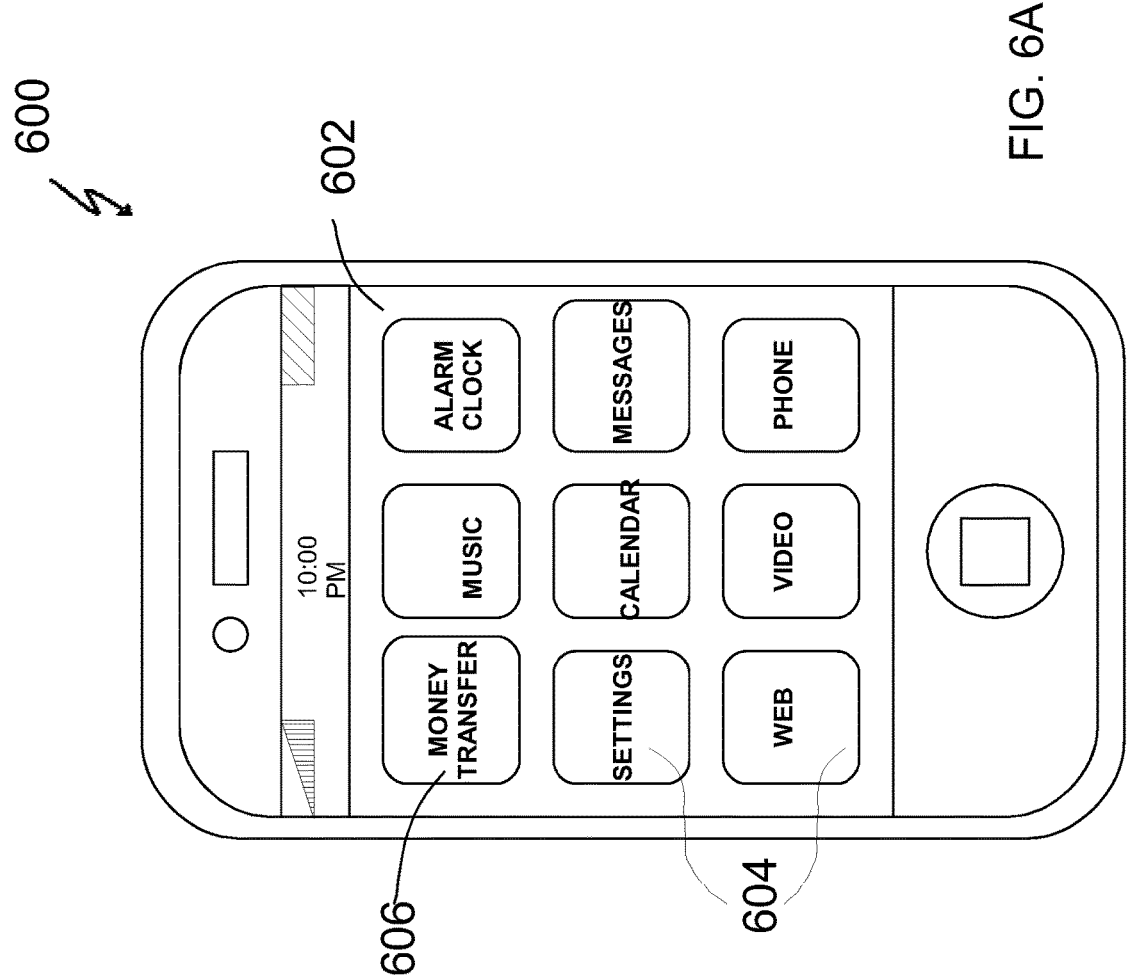

FIGS. 6A-6G illustrate exemplary graphical user interfaces of a portable electronic device for communicating with a gaming machine. FIG. 6A illustrates an exemplary user selectable menu displaying a plurality of indicators 604 on a display 602 of the portable electronic device 600. Each of the plurality of indicators 604 may correspond to an associated software application stored in a database (e.g. database 512 as illustrated in FIG. 5) of the portable electronic device 600. The portable electronic device 600 may initiate a software application when a user selection of a corresponding indicator 604 is detected. For example, a user may select the "Casino Money Transfer" indicator 606, which may be detected by the portable electronic device processor. The portable electronic device processor may associate the selection of the "Casino Money Transfer" indicator 606 to a funds transfer program on the portable electronic program and initiate the funds transfer program.

Figure 6B:
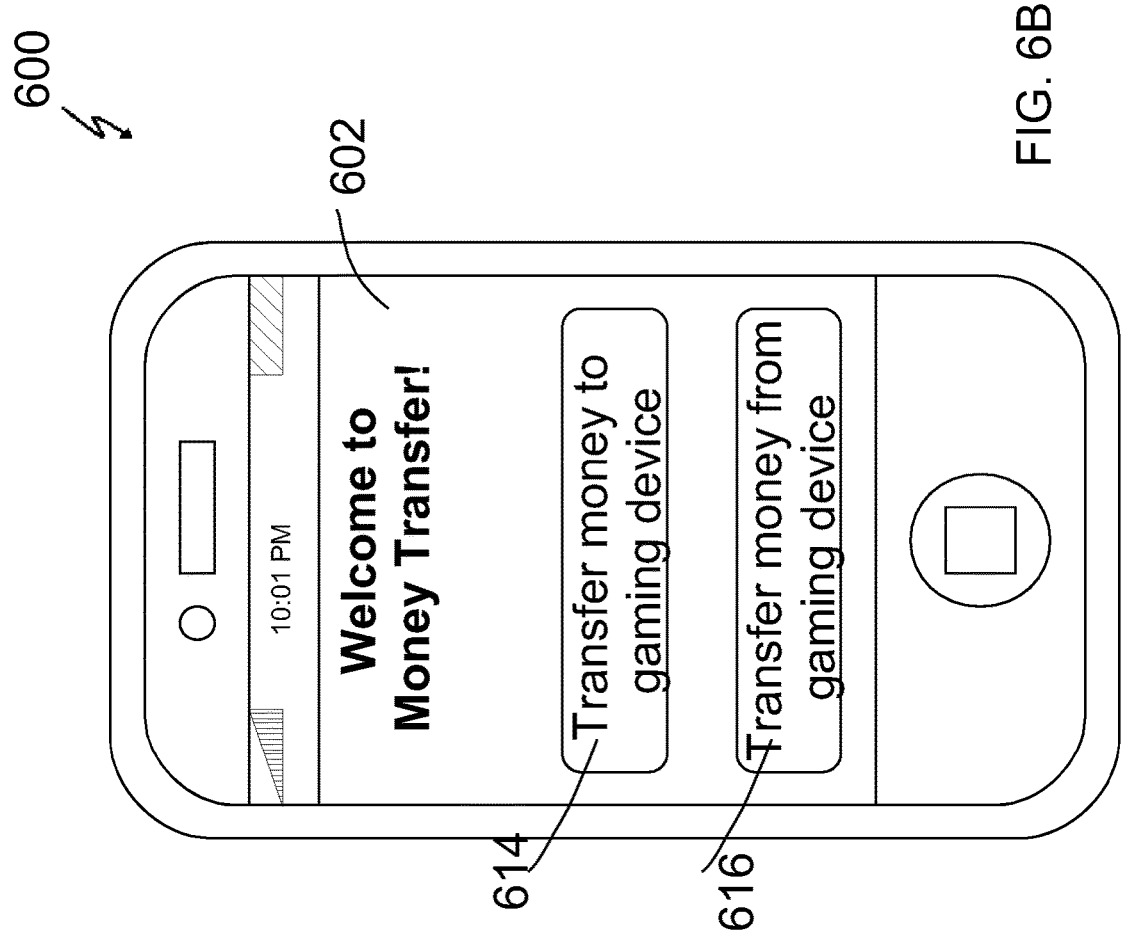

FIG. 6B illustrates an exemplary initial graphical user interface for a funds transfer program. The user of the portable electronic device may be prompted to select whether to transfer funds from the portable electronic device to the gaming device or to transfer funds from the gaming device to the portable electronic device. In one embodiment, a "Transfer Money To Gaming Device" indicator 614 and a "Transfer Money From Gaming Device" indicator 616 may be presented on the display 602 of the portable electronic device 600. In another embodiment, the portable electronic device may simply present a question, such as, "Transfer Funds To Gaming Machine?" and display a "Yes" or "No" indicator.

Figure 6C:
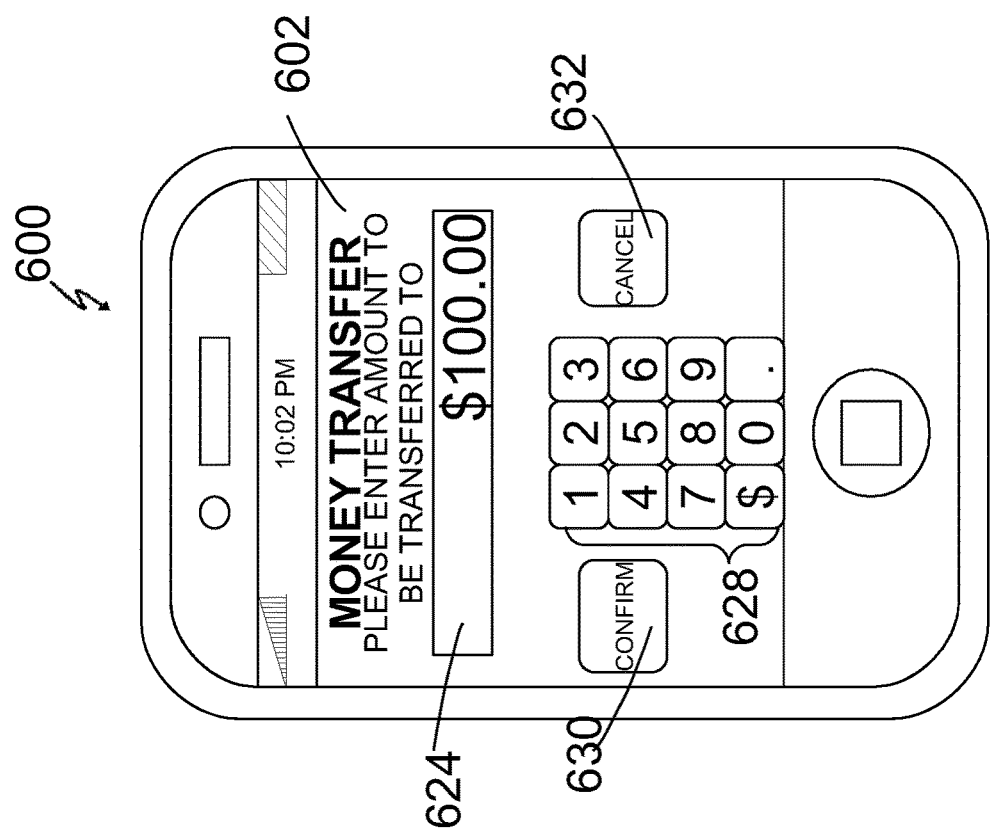

Upon selection of the "Transfer Money To Gaming Device" indicator 614, the user may be prompted to input a fund amount, as illustrated in FIG. 6C. The portable electronic device 600 may display a user-enterable field 624 on display 602. The user-enterable field 624 may prompt the user to enter a fund amount, credit amount, or any other information necessary to complete a transfer of funds to the gaming machine. For example, the fund amount may be a specific monetary amount, such as "$100.00" as illustrated in FIG. 6C. In another example, the user may enter a credit amount, such as credit accumulated in his player tracking account. The user-enterable field 624 may be populated using a numerical keypad 628, joystick, or any other user-input buttons or switches. In another embodiment, the fund amount may be a predefined or preset amount. For example, the preset amount maybe $20 and is the default value for each user action. Thus, the use may use one tap for a $20.00 transfer request to the gaming device, two taps for a $40 transfer request, and so on.

In one example, the user may confirm the amount inputted in the user-enterable field 624 by selecting a "Confirm" indicator 630. In another example, the user may cancel the selection by selecting the "Cancel" indicator 632. Selecting the "Cancel" indicator 632 may result in removal of the amounts entered in the user-selectable field 624. On the other hand, selection of the "Confirm" indicator 630 may result in the generation of a funds transfer request by the portable electronic device.

Figure 6D:
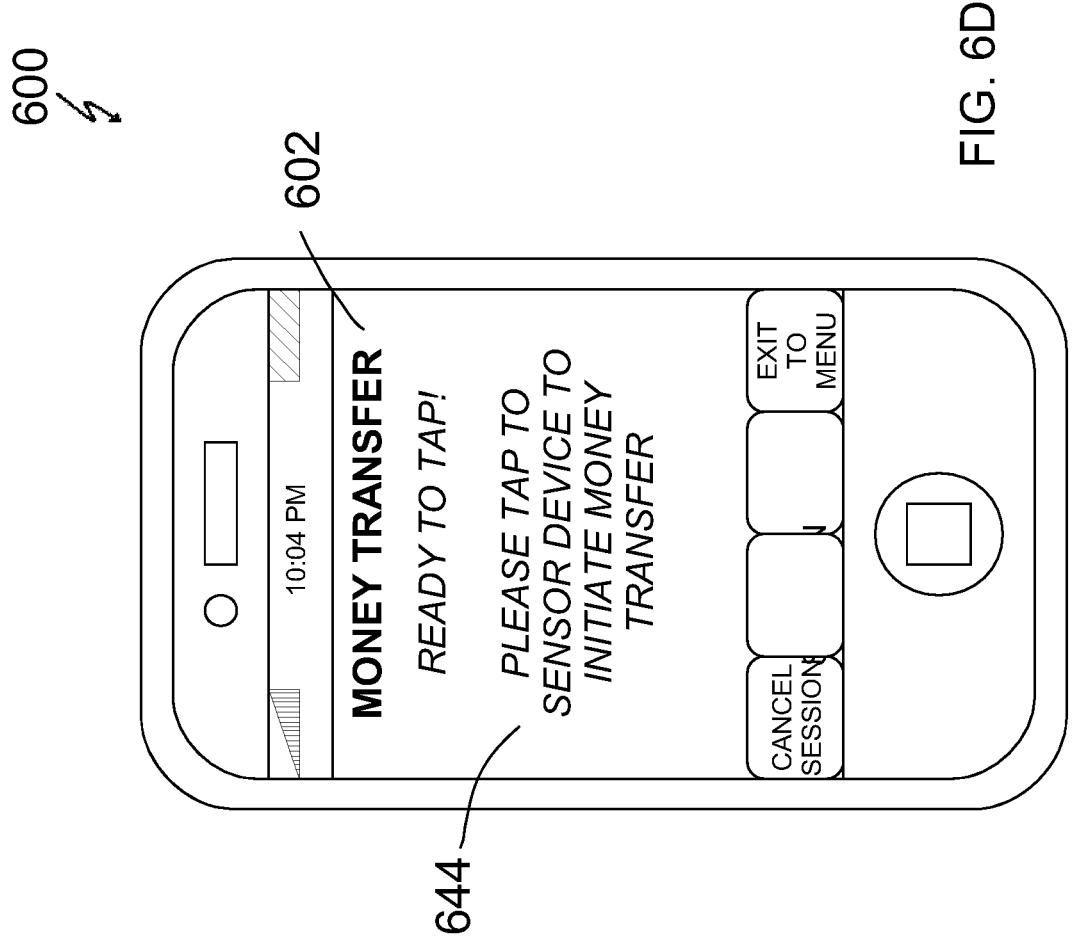

Referring now to FIG. 6D, an exemplary illustration of a graphical user interface to initiate money transfer. The portable electronic device 600 may display instructions on the display 602 to instruct the user how to initiate the transfer of funds to the gaming device. In one embodiment, the portable electronic device 600 may instruct the user to tap the portable electronic device on a sensor device (e.g. sensor device 116 as illustrated in FIG. 1 and sensor device 254 as illustrated in FIG. 2B). For example, the instructions may be to "Please Tap To Sensor Device To Initiate Money Transfer". In another embodiment, portable electronic device 600 may instruct the user to orally confirm transfer of funds to a microphone of the multi-functional peripheral device. For example, the instructions 644 may be to "Please Confirm Transfer By Saying 'Initiate Money Transfer' Into The Microphone".

FIG. 6E illustrates an example transfer of funds by contacting, with a portable electronic device, a sensor device associated with the multi-functional peripheral device. As illustrated, the portable electronic device 600 may physically contact a sensor device 654 proximate to the bill acceptor 622. The sensor device 654 may be any known device configured to detect and/or receive a sensory input. For example, the sensor device 654 may be an accelerometer, camera, microphone, touchpad, retina scanner, radio frequency identification reader, near-field magnetic reader, or any other device capable of receiving and detecting sensory input.

As illustrated, in another embodiment, the sensor device may be a touchpad 652 located on the gaming machine 612. Thus, to initiate the transfer of funds, the user may physically tap or contact the touchpad 652 with the portable electronic device 600.

Subsequent to physically contacting the sensor device 654, the portable electronic device may transmit a transfer funds request to the multi-functional peripheral device. The funds transfer request may include any information and requests to facilitate transfer of funds to the gaming machine. For example, the funds transfer request may include a unique user identification (ID), password, fund amount, funding source such as bank routing and checking account number and/or player tracking account number, and any other information or data necessary to facilitate the transfer of funds. In another embodiment, the funds transfer request may include location information of the portable electronic device, location information of the gaming device, time stamp data, and any other data or information that may be used to authenticate and/or verify the portable electronic device and the gaming device to ensure that the funds are transferred to the proper gaming device as further discussed with reference to FIG. 8.

Figure 6F:
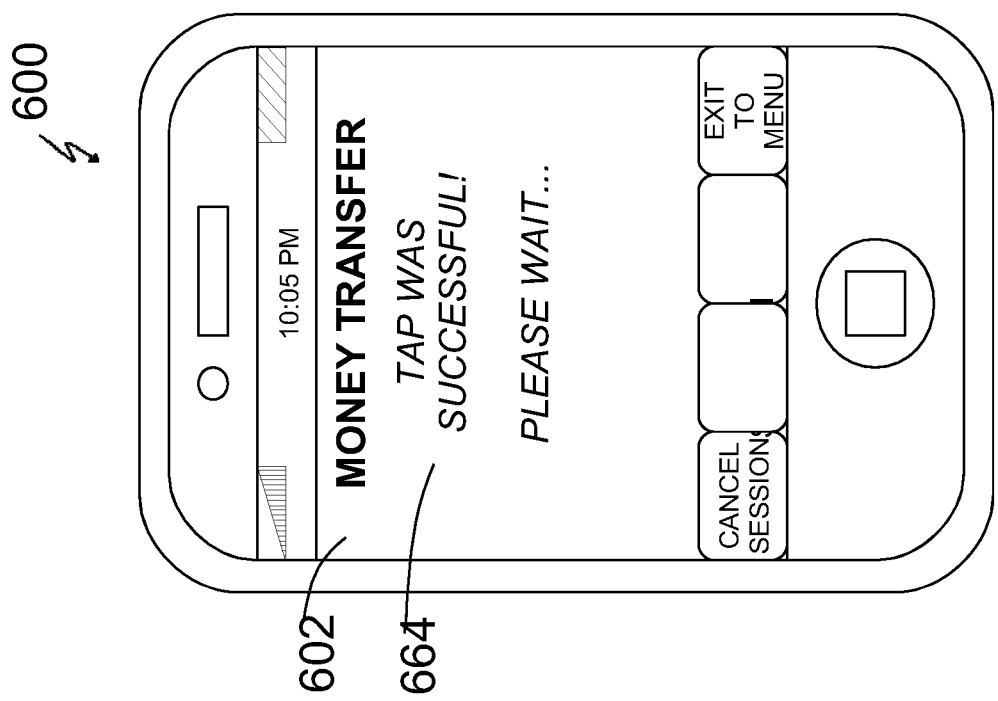

FIG. 6F illustrates an example graphical user interface indicating that contact with the sensor device as successful. In one embodiment, successful contact with the sensor device may be based upon receipt of a successful message by the portable electronic device 600 from the multi-functional peripheral device. In another embodiment, successful contact with the sensor device may be based upon successful transmission of the funds transfer request from the portable electronic device 600 to the multi-functional peripheral device. In one example, the message 664 may inform the user that the user action was successfully performed, the sensor device detected the sensory input, and that the multi-functional peripheral device is processing the funds transfer request.

If contact was not successful (e.g. the sensor device did not detect a sensory input), the portable electronic device 600 may display an unsuccessful message (not shown). For example, a "Please Try Again" message may be displayed on the display 602 of the portable electronic device 600. In another embodiment, if the sensor device associated with the multi-functional peripheral device does not detect a sensory input within a predetermined amount of time (e.g. after 30 seconds, 1 minute, or any other predetermined time period), the portable electronic device 600 may display an unsuccessful message.

Figure 6G:
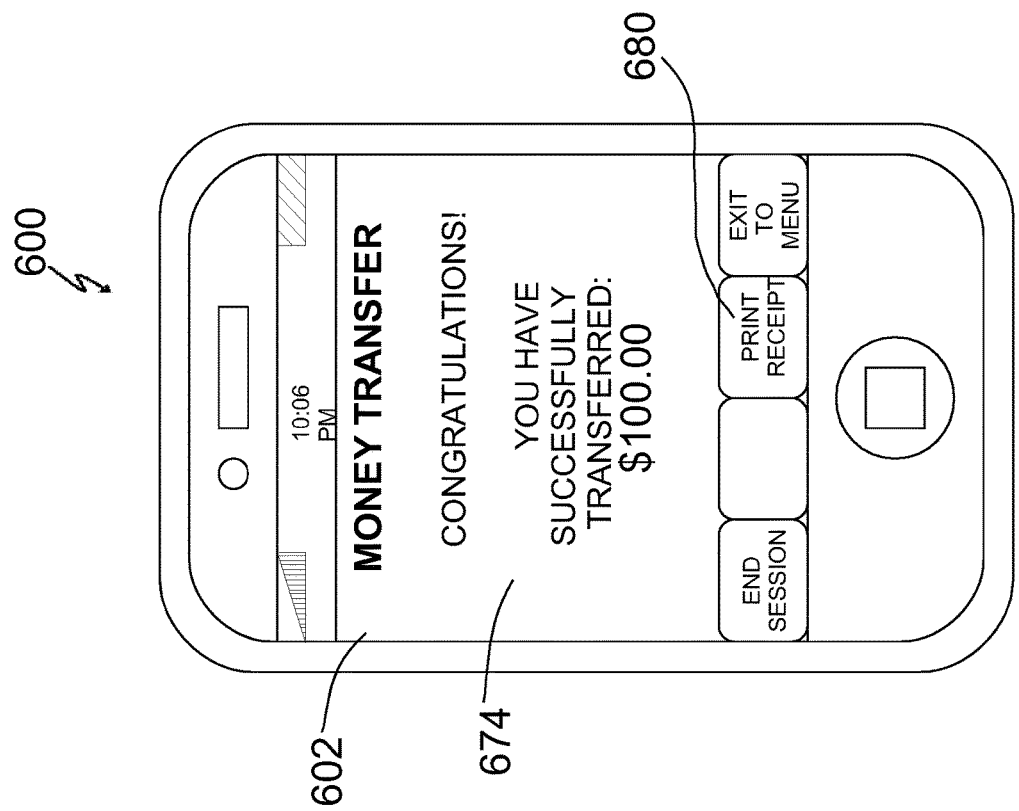

FIG. 6G illustrates an exemplary graphical user interface representing the completion of the funds transfer. Upon receipt of the funds transfer request received from the portable electronic, the multi-functional peripheral device may process the funds transfer request. In other words, the multi-functional peripheral device may parse the funds transfer request to determine at least one of (i) the fund amount; (ii) the source of the funds; (iii) unique user ID and password; (iv) sufficient funds to transfer the fund amount; (v) location of the transaction, and any other necessary information to facilitate the transfer of funds from or to the gaming machine. For example, the multi-functional peripheral device may determine that the user would like to debit $100 from his Credit Union checking account. The multi-functional peripheral device may transmit a debit request to the Credit Union server (e.g. third-party server 120 as illustrated in FIG. 1). The debit request may include the fund amount, user ID and password, bank routing and checking account number, and any other necessary information or data. If there are sufficient funds in the user's checking account, the Credit Union may debit the user's checking account by the fund amount and transmit the fund amount to the multi-functional peripheral device.

In another embodiment, the multi-functional peripheral device may determine that the user would like to charge $100 to his credit card. The multi-functional peripheral device may transmit a charge request to the credit card server (e.g. third-party server 120 as illustrated in FIG. 1). The charge request may include the fund amount, user ID and password, credit card number, security code, zip code, and any other necessary information or data. If the user's credit limit is not exceeded, the user's account may be charged the fund amount and the fund amount may be transmitted to the multi-functional peripheral device.

In still another embodiment, the multi-functional peripheral device may determine that the user would like to debit player credits from the user's player tracking account. The multi-functional peripheral device may transmit a debit credit request to the player tracking server (e.g. player tracking server 124 as illustrated in FIG. 1). The debit credit request may include the fund amount, user ID and password, player tracking number, and any other necessary information or data. If the user has sufficient credit in his player tracking account, the user's account may be debited the credit amount and the credit amount may be transmitted to the multi-functional peripheral device.

If the multi-functional peripheral device receives a fund amount from a third-party server, a successful acknowledgement may be transmitted to the portable electronic device as illustrated in FIG. 6G. In one example, the portable electronic device 600 may present a message 674 such as "Congratulations: You have successfully transferred $100.00.". Optionally, the user may be able to print a receipt recoding the transfer of funds. For example, the user may select the "Print Receipt" indicator 680 to create a virtual receipt. The portable electronic device 600 may then display the virtual receipt (not shown) on the display 602 and digitally store the virtual receipt in a memory of the portable electronic device 600.

According to one embodiment, the amount of funds or credits received by the multi-functional peripheral device may also be displayed on a display of the gaming device as credits for use in playing a game of chance on the gaming machine. The multi-functional peripheral device may transmit a funds notification to the gaming machine processor to notify the gaming machine that the user has transferred funds to the gaming machine. The gaming machine processor may then display the credit amount on the display of the gaming device.

Figure 7:
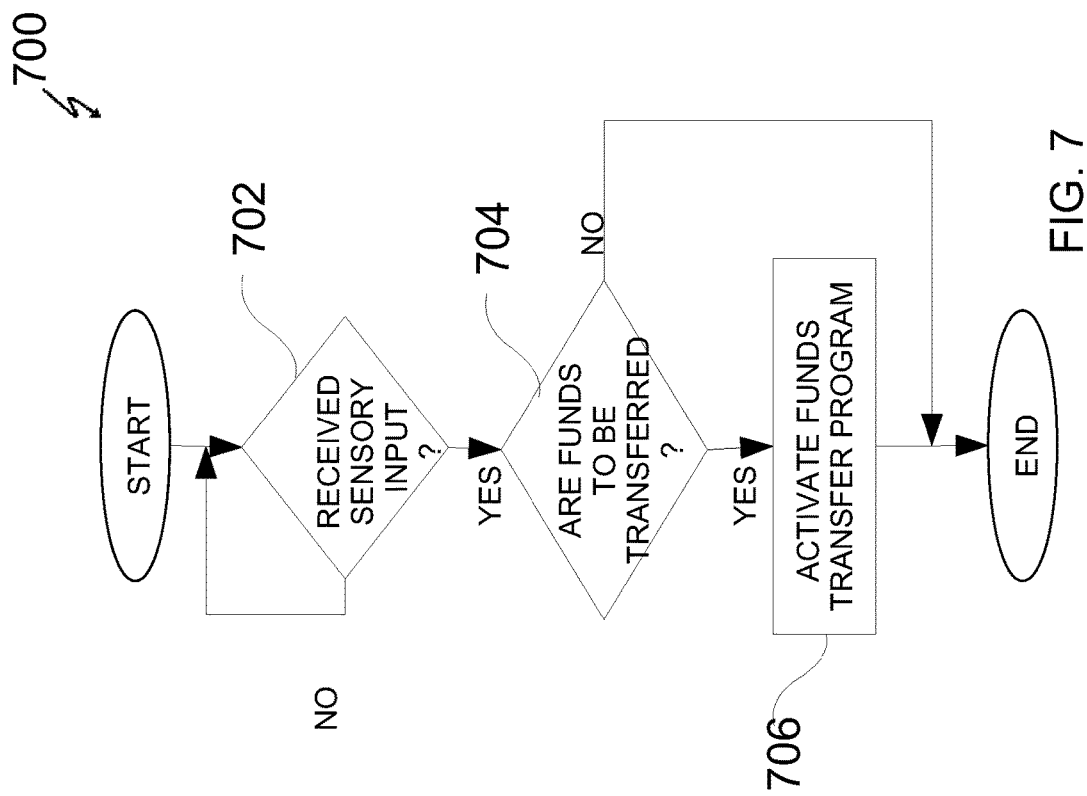
FIG. 7 illustrates an example flow diagram of a method for transferring funds between a portable electronic device and a gaming device.

FIG. 7 illustrates an example flow diagram of a method for transferring funds between a portable electronic device and a gaming device. The method 700 initially begins with determining whether a sensory input is detected or received by the multi-functional peripheral device at 702. If no sensory input is detected or received, then the multi-functional peripheral device may continue to wait for the sensory input.

The sensory input may be detected or received by at least one sensor device associated with the multi-functional peripheral device. The sensory device may be any known device configured to detect and/or receive a sensory input. For example, the at least one sensor device may be an accelerometer, camera, microphone, touchpad, retina scanner, radio frequency identification reader, near-field magnetic reader, or any other device capable of receiving and detecting sensory input. The type of sensory input received or detected may be based on the sensory device. For example, a user may physically contact the sensor device via a tap, touch, or any other physical contact on a touchpad. The physical contact may initiated by the user (e.g. using a finger to tap the sensor device), physical object (e.g. pen, coin, and the like), and/or a remote device associated with the user. The remote device may, for example, be any portable computing device such as a cellular phone, portable media player, personal digital assistant (PDA), and the like. In another embodiment, the sensory input may be an audio input received by a microphone associated with the multi-functional peripheral device.

Based upon the sensory input received as well as the context in which the sensory input is detected, a function may be associated with the sensory input. For example, as illustrated in FIG. 7, a determination is made as to whether funds should be transferred to or from a gaming machine at 704. This determination may, in part, be made based upon the context. For example, the multi-functional peripheral device may, simultaneously or in conjunction with the detection of the sensory input, receive a funds transfer request from the portable electronic device. Thus, a sensory input detection of one tap (e.g. an accelerometer associated with the multi-functional peripheral device may detect movement of one tap) may be associated with an initiation to transfer funds to a gaming machine in the context of a transfer of funds. In another example, a sensory input detection of two taps (e.g. a touch pad associated with the multi-functional peripheral device may detect movement of two taps) may be associated with an initiation to transfer funds from a gaming machine in the context of a transfer of funds—in other words, the player has completed playing the game of chance and would like to cash out his credits from the gaming machine.

If it is determined that funds are to be transferred at 704, the multi-functional peripheral device may activate a funds transfer program at 706. The funds transfer program may be any program configured to facilitate a transfer of funds to or from a gaming machine. In one embodiment, the program stored in a memory of the multi-functional peripheral device (e.g. memory 424 as illustrated in FIG. 4B). When activated, the multi-functional peripheral device may parse or process a funds transfer request from the portable electronic device to determine at least one of (i) the fund amount; (ii) the source of the funds; (iii) unique user ID and password; (iv) sufficient funds to transfer the fund amount; (v) location of the transaction, and any other necessary information to facilitate the transfer of funds from or to the gaming device. For example, the multi-functional peripheral device may determine that the user would like to debit $100 from his Credit Union checking account. The multi-functional peripheral device may transmit a debit request to the Credit Union server (e.g. third-party server 120 as illustrated in FIG. 1). The debit request may include the fund amount, user ID and password, bank routing and checking account number, and any other necessary information or data. If there are sufficient funds in the user's checking account, the Credit Union may debit the user's checking account by the fund amount and transmit the fund amount to the multi-functional peripheral device.

In another embodiment, the multi-functional peripheral device may determine that the user would like to charge $100 to his credit card. The multi-functional peripheral device may transmit a charge request to the credit card server (e.g. third-party server 120 as illustrated in FIG. 1). The charge request may include the fund amount, user ID and password, credit card number, security code, zip code, and any other necessary information or data. If the user's credit limit is not exceeded, the user's account may be charged the fund amount and the fund amount may be transmitted to the multi-functional peripheral device.

In still another embodiment, the multi-functional peripheral device may determine that the user would like to debit player credits from the user's player tracking account. The multi-functional peripheral device may transmit a debit credit request to the player tracking server (e.g. player tracking server 124 as illustrated in FIG. 1). The debit credit request may include the fund amount, user ID and password, player tracking number, and any other necessary information or data. If the user has sufficient credit in his player tracking account, the user's account may be debited the credit amount and the credit amount may be transmitted to the multi-functional peripheral device.

Although the communication to the external fund source was described above as being initiated by the multi-functional peripheral device, in another embodiment, the fund transfer request can also be made by the portable electronic device directly to the fund source via its own communication link. For example, the portable electronic device can directly contact a bank (e.g. third-party server 120 as illustrated in FIG. 1) to request a secured virtual check to be transferred to the gaming device 200 or transferred from the gaming device 200 for deposit to the bank account.

Figure 8:
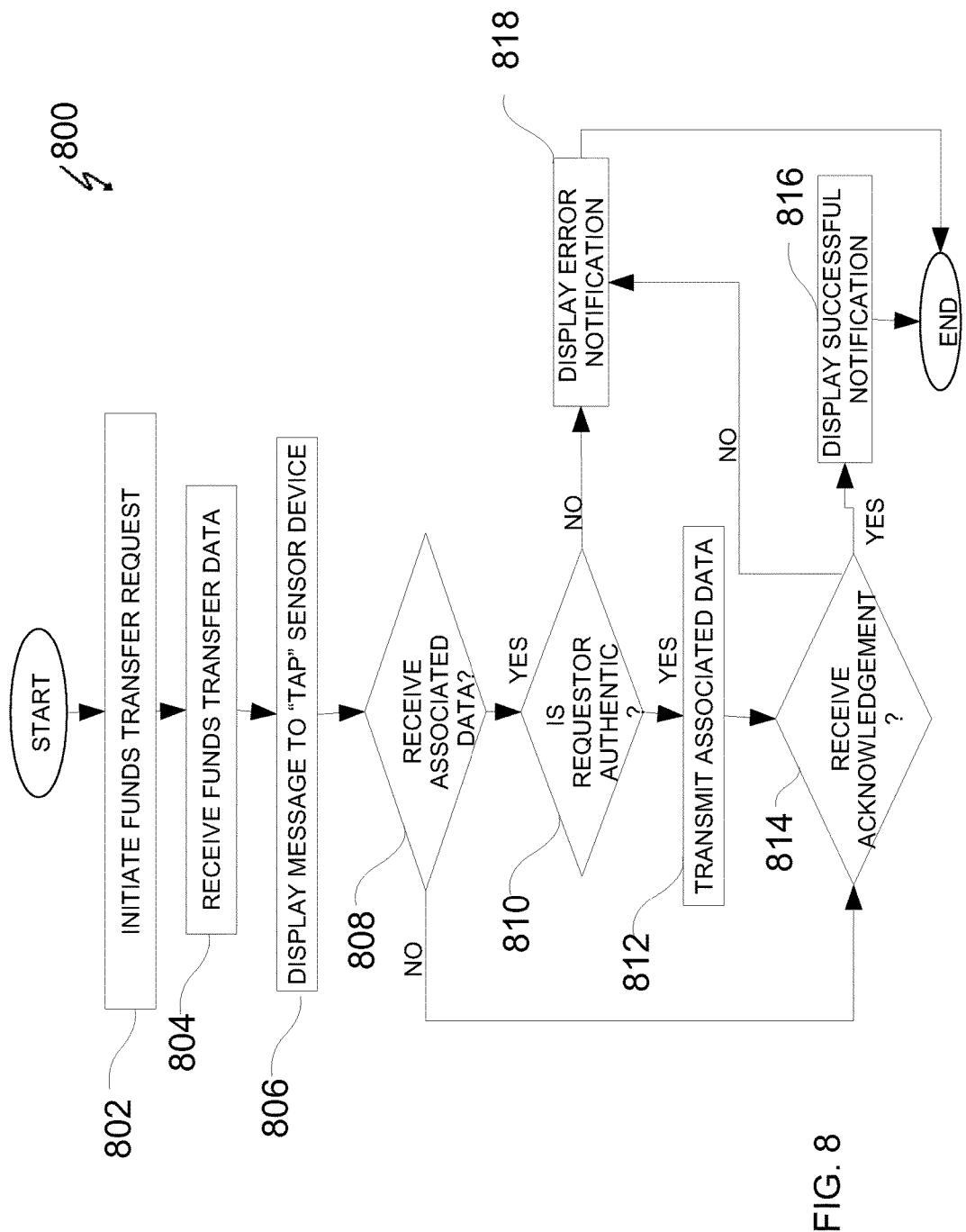
FIG. 8 illustrates an exemplary flow diagram of a method for transferring funds from or to a gaming device.

FIG. 8 illustrates an exemplary flow diagram of a method for transferring funds from or to a gaming device. The method 800 may begin with initiating, at a portable electronic device, a user request to transfer funds at 802. In one embodiment, the user request to transfer funds may be initiated by detecting a user selection of an associated indicator. For example, the portable electronic device may detect user selection of a "Cash Out" indicator, "Money Transfer" indicator (e.g., "Money Transfer" indicator 606 as illustrated in FIG. 6A) or any other similar indicator. In another embodiment, the user request to transfer funds may be an audio command. The audio command may be any audio command received and recognizable by the portable electronic device as an instruction or command to transfer funds. For example, the audio command may include words such as "cash out", "transfer funds", and the like.

The portable electronic device may receive funds transfer data for the requested funds transfer at 804. The funds transfer data may include any information, requests, and data to facilitate the transfer of funds. For example, the funds transfer data may include: (i) a request to transfer funds to the gaming machine; (ii) request to cash out and transfer funds from the gaming machine; (iii) fund amount to transfer to the gaming machine; (iv) source of the funds to transfer to the gaming machine; (v) unique user ID and password; (vi) whether to transfer receipt of the funds to the gaming machine or the portable electronic device; (vii) location of the transaction, and any other necessary information to facilitate the transfer of funds from or to the gaming machine.

In one embodiment, a message to "Tap" a sensor device (e.g. sensor device 116 as illustrated in FIG. 1 and sensor device 254 as illustrated in FIG. 2B) associated with the multi-functional peripheral device may be displayed on a display of the portable electronic device at 806. The portable electronic device may display instructions on the display to instruct the user how to initiate the transfer of funds to the gaming device. For example, the instructions may be to "Please Tap To Sensor Device To Initiate Money Transfer". In another embodiment, portable electronic device may instruct the user to orally confirm transfer of funds to a microphone of the multi-functional peripheral device rather than tap a sensor device. For example, the instructions 644 may be to "Please Confirm Transfer By Saying 'Initiate Money Transfer' Into The Microphone".

The multi-functional peripheral device may determine whether to request associated data from the portable electronic device at 808. In one embodiment, the associated data may be encrypted using any known encryption method such as Advanced Encryption Standard (AES), Message Authentication Code (MAC), Hash based Message Authentication Code (HMAC), SHA-2, and the like. The associated data may be any information or data necessary to complete a transfer of funds to the gaming machine such as: (i) the fund amount; (ii) the source of the funds; (iii) unique user ID and password; (iv) account information (e.g. bank routing number, checking account number, credit card number, and the like); (v) destination address (e.g. gaming machine identification to ensure funds are transferred to the proper gaming machine); (vi) location of the transaction, and any other necessary information to facilitate the transfer of funds to the gaming device. The gaming machine may be identified by any known methods such as MAC address, IP address, unique gaming machine identification, bar code on the gaming machine, location information for the gaming machine, and the like. For example, the user may manually input the unique gaming machine identification in the portable electronic device. In another embodiment, the user may scan a bar code on the gaming machine into the portable electronic device.

Thus, the determination may be based on whether the funds transfer request is requested from the gaming machine or to the gaming machine. In other words, if the funds transfer request is to transfer funds to the portable electronic device (i.e. the player would like to cash out of the gaming machine), then the multi-functional peripheral device need not obtain associated data. However, if the funds transfer request is to transfer funds to the gaming machine (i.e. the player would like to play a game of chance on the gaming machine), then the multi-functional peripheral device will need associated data to facilitate the transfer of funds.

If the multi-functional peripheral device receives associated data at 808, the multi-functional peripheral device may authenticate the user at 810. In one embodiment, the multi-functional peripheral device may authenticate the user by transmitting the username and password to the authentication server (e.g. authentication server 130 illustrated in FIG. 1). In another embodiment, an authentication request may be transmitted to the gaming machine to transmit the username and password to the authentication server. It will now be known that any server configured to authenticate and/or verify a user may be used, such as the player tracking server (e.g. player tracking server 124 illustrated in FIG. 1). Additionally, although username and password credentials are illustrated in the authentication process, any other type of credentials or criteria maybe used. For example, biometrics such as facial features, fingerprints, voice prints, and the like, may be used.

In one embodiment, verification the location of the gaming device and/or the location of the user's portable electronic device may be required as additional parameters for a complete authorization of the transaction. Location data may be obtained automatically without user interaction or input using various location determining technology such as global positioning systems (GPS), triangulation and trilateration with cellular towers, Wi-Fi access points locationing, radio frequency (RF) fingerprinting, and the like. For instance, Wi-Fi based location appliances, such as the Cisco Wireless Location Appliance™ manufactured by Cisco Systems, Inc. (San Jose, Calif., US), may be used as a location tracking system to determine the location of the portable electronic device and the gaming devices inside a casino.

It is common for the local gaming control jurisdiction to have rules regarding where gaming can take place and the maximum funds that can be transferred in a transaction. Location data of the gaming device, inferred by the location of the multi-functional peripheral device housed inside its cabinet, is desirable to verify that the gaming device is in a location where gaming is allowed, such as a casino. Similarly, location data of the portable electronic device is desirable to verify that the user initiating the funds transfer request is indeed near the verified location of an approved gaming device. Other transaction requirements such as fund transfer amount can also be verified as not to exceed allowable amount.

The authentication server may compare the received username and password to a previously submitted and/or saved username and password stored in a database of the authentication server. If there is no match, the authentication server may transmit an error message to the gaming machine and/or the multi-functional peripheral device, which in turn may transmit an error notification to the portable electronic device for display on a display of the portable electronic device at 818.

If there is a match, the authentication server may transmit a successful message to the gaming machine and/or multi-functional peripheral device. In one embodiment, the multi-functional peripheral device may then transmit the associated data to the gaming machine at 812 to process the funds transfer request. In another embodiment, the multi-functional device may process the funds transfer request and transmit the associated data to a third party server (e.g. third-party server 120 as illustrated in FIG. 1) or the gaming server (e.g. gaming server 112 as illustrated in FIG. 1). The multi-functional device may parse the funds transfer request to determine at least one of (i) the fund amount; (ii) the source of the funds; (iii) unique user ID and password; (iv) sufficient funds to transfer the fund amount, (v) location of the transaction, and any other necessary information to facilitate the transfer of funds from or to the gaming machine. For example, the multi-functional peripheral device may determine that the user would like to debit $100 from his Credit Union checking account. The multi-functional peripheral device may transmit a debit request to the Credit Union server (e.g. third-party server 120 as illustrated in FIG. 1). The debit request may include the fund amount, user ID and password, bank routing and checking account number, and any other necessary information or data. If there are sufficient funds in the user's checking account, the Credit Union may debit the user's checking account by the fund amount and transmit the fund amount to the multi-functional peripheral device.

In another embodiment, the multi-functional peripheral device may determine that the user would like to charge $100 to his credit card. The multi-functional peripheral device may transmit a charge request to the credit card server (e.g. third-party server 120 as illustrated in FIG. 1). The charge request may include the fund amount, user ID and password, credit card number, security code, zip code, and any other necessary information or data. If the user's credit limit is not exceeded, the user's account may be charged the fund amount and the fund amount may be transmitted to the multi-functional peripheral device.

In still another embodiment, the multi-functional peripheral device may determine that the user would like to debit player credits from the user's player tracking account. The multi-functional peripheral device may transmit a debit credit request to the player tracking server (e.g. player tracking server 124 as illustrated in FIG. 1). The debit credit request may include the fund amount, user ID and password, player tracking number, and any other necessary information or data. If the user has sufficient credit in his player tracking account, the user's account may be debited the credit amount and the credit amount may be transmitted to the multi-functional peripheral device.

If the multi-functional peripheral device receives a fund amount acknowledgement at 814 from the third-party server or the gaming server, a successful acknowledgement may be transmitted to the portable electronic device for display on a display of the portable electronic device at 816. In one example, the portable electronic device 600 may present a message such as "Congratulations: You have successfully transferred $100.00". Additionally, the multi-functional peripheral device may also send a digital receipt of the transaction record to the portable electronic device as well as storing a copy in its own memory for accounting, auditing, dispute resolution, and verification purposes. In one embodiment, the amount of funds or credits received by the multi-functional peripheral device may also be displayed on a display of the gaming device as credits for use in playing a game of chance on the gaming machine. The multi-functional peripheral device may transmit a funds notification to the gaming machine processor to notify the gaming machine that the user has transferred funds to the gaming machine. The gaming machine processor may then display the credit amount on the display of the gaming device.

If the multi-functional peripheral device does not receive associated data at 808, in one embodiment, the multi-functional peripheral device may transmit a cash out request to the gaming machine and wait for a cash out acknowledgement and/or confirmation from the gaming machine at 814. If the multi-functional peripheral device does not receive a cash out acknowledgement at 814, an error notification may be transmitted to the portable electronic device for display on a display of the electronic device at 818.

If the multi-functional peripheral device receives a cash out acknowledgement at 814, in one embodiment, the multi-functional peripheral device may inform the portable electronic device of the successful transfer of funds to the portable electronic device at 816 and print an electronically-readable ticket on a printer associated with the multi-functional peripheral device. In another embodiment, the multi-functional peripheral device may inform the portable electronic device of the successful transfer of funds to the portable electronic device at 816 and transmit a digital ticket to the portable electronic device. The virtual digital ticket may be presented on the display and/or saved in a memory associated with the portable electronic device. In one embodiment, the virtual digital ticket may be encrypted using any known encryption method such as AES, MAC, HMAC, SHA-2, and the like.

Figure 9:
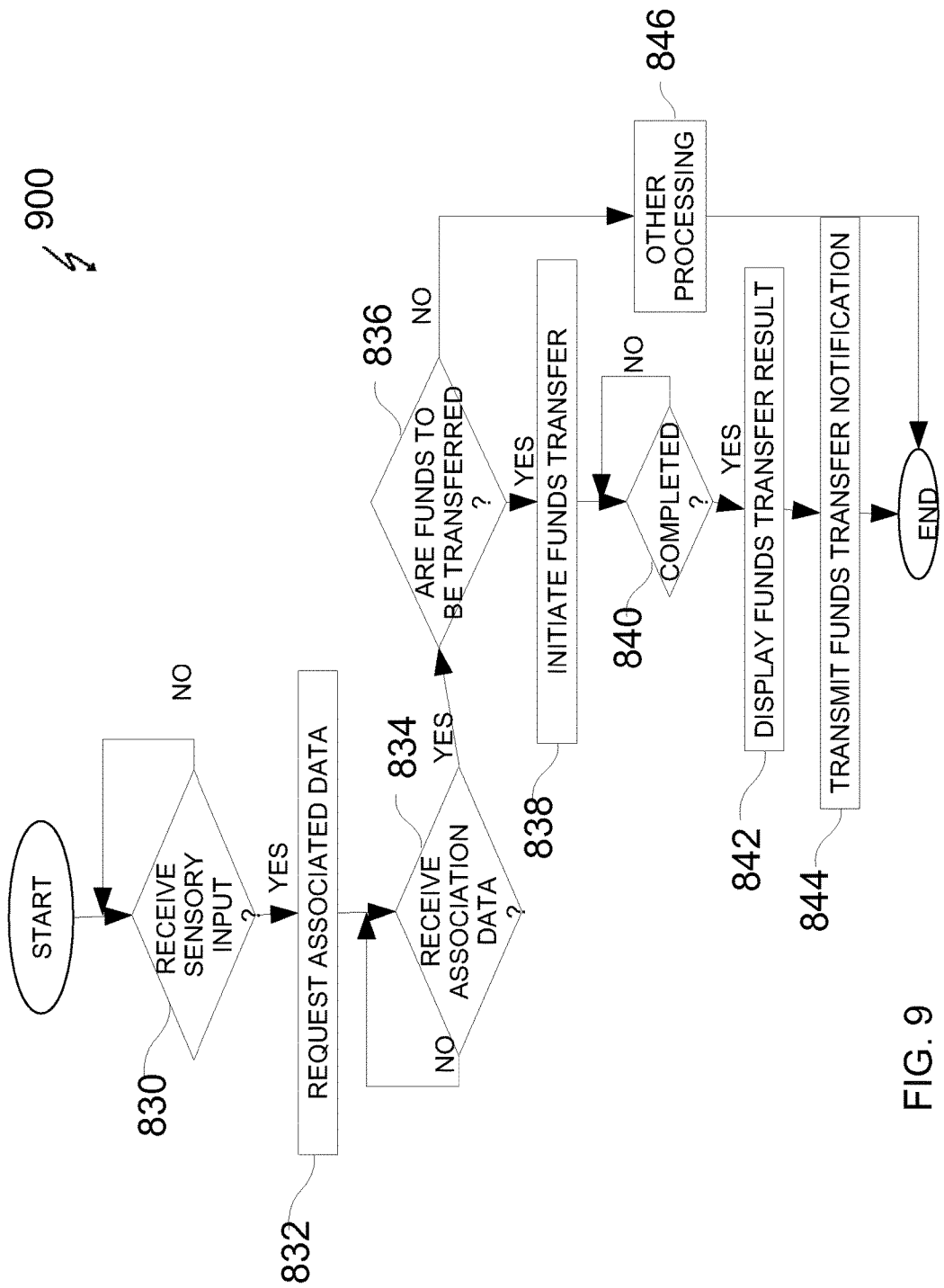
FIG. 9 illustrates an exemplary flow diagram of a method for transferring funds to a gaming device from a portable electronic device.

FIG. 9 illustrates an exemplary flow diagram of a method for transferring funds to a gaming device from a portable electronic device. The method 900 may begin with determining whether a sensory input is detected or received by a multi-functional peripheral device at 830. If no sensory input is detected or received, then the multi-functional peripheral device may continue to wait for a sensory input.

The sensory input may be detected or received by a sensor device associated with the multi-functional peripheral device. The sensory device may be any known device configured to detect and/or receive a sensory input. For example, the sensor device may be an accelerometer, camera, microphone, touchpad, retina scanner, radio frequency identification reader, near-field magnetic reader, or any other device capable of receiving and detecting sensory input.

The sensory input may be any type of known sensory input such as an audio, visual, and/or physical contact received from a user. The type of sensory input received or detected may be based on the sensory device. For example, a user may physically contact the sensor device via a tap, touch, or any other physical contact on a touchpad. The physical contact may initiated by the user (e.g. using a finger to tap the sensor device), physical object (e.g. pen, coin, and the like), and/or a remote device associated with the user. The remote device may, for example, be any portable computing device such as a cellular phone, portable media player, PDA, and the like. In another embodiment, the sensory input may be an audio input received by a microphone associated with the multi-functional peripheral device.

If the multi-functional peripheral device detects a sensory input at 830, the multi-functional peripheral device may request associated data from the portable electronic device at 832. The associated data may be any information or data necessary to complete a transfer of funds to the gaming machine such as: (i) the fund amount; (ii) the source of the funds; (iii) unique user ID and password; (iv) account information (e.g. bank routing number, checking account number, credit card number, and the like); (v) destination address (e.g. gaming machine identification to ensure funds are transferred to the proper gaming machine); (vi) location of the transaction, and any other necessary information to facilitate the transfer of funds to the gaming device. The gaming machine may be identified by any known methods such as MAC address, IP address, unique gaming machine identification, bar code on the gaming machine, location information for the gaming machine, and the like. For example, the user may manually input the unique gaming machine identification in the portable electronic device. In another embodiment, the user may scan a bar code on the gaming machine into the portable electronic device.

In one embodiment, verification the location of the gaming device and/or the location of the user's portable electronic device maybe required as additional parameters for a complete authorization of the transaction. Location data may be obtained automatically without needing the user inputs by various locationing technology such as GPS, triangulation and trilateration with cellular towers, Wi-Fi access points locationing, RF fingerprinting, and the like. For instance, Wi-Fi based location appliances, such as the Cisco Wireless Location Appliance™ manufactured by Cisco Systems, Inc. (San Jose, Calif., US), may be used as a location tracking system to determine the location of the portable electronic device and the gaming devices inside a casino.

It is common for the local gaming control jurisdiction to have rules regarding where gaming can take place and the maximum funds that can be transferred in a transaction. Location data of the gaming device, inferred by the location of the multi-functional peripheral device housed inside its cabinet, is desirable to verify that the gaming device is in a location where gaming is allowed, such as a casino. Similarly, location data of the portable electronic device is desirable to verify that the user initiating the funds transfer request is indeed near the verified location of an approved gaming device. Other transaction requirements such as fund transfer amount can also be verified as not to exceed allowable amount.

Once the multi-functional peripheral device receives the associated data at 834, the multi-functional peripheral device may process the associated data to determine whether funds are to be transferred at 836. In one embodiment, the associated data may be encrypted using any known encryption method such as AES, MAC, HMAC, SHA-2, and the like. The multi-functional peripheral device may parse the associated data for a unique user ID, password, fund amount, funding source (e.g. a bank routing and checking account number, player tracking account number, credit card number, and the like), transaction location, and any other information or data necessary to facilitate the transfer of funds.

If the multi-functional peripheral device determines that funds are to be transferred to the gaming device at 836, the multi-functional peripheral device may initiate a funds transfer at 838. On the other hand, if the multi-functional peripheral device determines that funds are not to be transferred to the gaming device 836, the multi-functional peripheral device may perform other processing functions at 846. Other processing functions may, for example, be determining whether the received sensory input is associated with playing a game of chance, social networking, or any other non-gaming functions. For example, a visual sensory input received by a camera may be used to play a game of chance. The camera may detect user gestures to represent user actions such as hit, stand, double down, and the like. In another example, a visual sensory input may be received by the camera to allow the player to video conference with friends within this social network.

If the funds transfer is completed at 840, the gaming device may display a funds transfer result on a display (e.g., display 208 as illustrated in FIG. 2A, display 256 as illustrated in FIG. 2B) of the gaming device at 842. The gaming device may display the additional funds transferred to the gaming machine as credits to allow the player to play the game of chance.

A funds transfer notification may be transmitted to the portable electronic device at 844 to inform the user of the successful transfer of funds. In one embodiment, the portable electronic device may display a successful funds transfer notification informing the user of the completion of the transfer of funds as well as the total amount of credits that are on the gaming machine. Additionally, the multi-function peripheral device may also send a digital receipt of the transaction record to the portable electronic device as well as storing a copy in its own memory for accounting, auditing, dispute resolution, and verification purposes.

Additional details on peripheral devices for gaming machines are provided in U.S. patent application Ser. No. 12/945,889, entitled "PERIPHERAL MANAGEMENT DEVICE FOR VIRTUAL GAME INTERACTION," filed concurrently herewith, and hereby incorporated herein by reference.

While embodiments and applications of this invention have been shown and described, it would be apparent to those skilled in the art having the benefit of this disclosure that many more modifications than mentioned above are possible without departing from the inventive concepts herein. For example, although illustrated with use in a gaming environment, this is not intended to be limiting as other uses are contemplated, such as in a banking machine, snack or drink machine at an educational environment, grocery store, gas station and the like.

What is claimed is:

1. A multi-functional peripheral device configured to couple to a gaming device, comprising:
   at least one sensor device configured to detect at least one sensory input from a portable electronic device, wherein the at least one sensor device comprises at least one accelerometer;
   a memory having at least one money transfer program configured to wirelessly transfer funds;
   a wireless interface configured to communicate with the portable electronic device; and
   a processor configured to:
     determine if the at least one sensory input is associated with the at least one money transfer program;
     determine if the at least one sensory input is to transfer money to the gaming machine or transfer money to the portable electronic device if it is determined that the at least one sensory input is associated with the at least one money transfer program;

execute the at least one money transfer program to transfer money to the gaming machine if it is determined that the at least one sensory input is to transfer money to the gaming machine; and execute the at least one money transfer program to transfer money to the portable electronic device if it is determined that the at least one sensory input is to transfer money to the portable electronic device, wherein the at least one money transfer program is configured to wirelessly transfer funds between the portable electronic device and the gaming device, wherein the multi-function peripheral device is at least partially housed within the gaming device, and wherein the gaming device comprises a slot machine.

2. The multi-functional peripheral device of claim 1, wherein the at least one sensory input detected by the at least one accelerometer is used for authentication.

3. The multi-functional peripheral device of claim 1, wherein the sensory input is an audio input, a visual input, or a physical contact.

4. The multi-functional peripheral device of claim 1, wherein the sensory input is a predefined user action associated with a fund transfer request.

5. The multi-functional peripheral device of claim 1, wherein the wireless transfer of funds yields at least one source of funding to play a game of chance.

6. The multi-functional peripheral device of claim 1, wherein the at least one sensor device is configured to detect at least one user action, wherein the at least one user action is used to play a game of chance on the gaming device.

7. The multifunctional peripheral device of claim 6, wherein the at least one user action is an audio input, a visual input, or a physical contact.

8. A system to transfer funds in a gaming environment, comprising:
 a portable electronic device including:
  a first memory having a first money transfer program configured to wirelessly transfer funds; and
  a first processor configured to execute the first money transfer program,
  wherein the first money transfer program is configured to transmit a request to transfer funds;
 a gaming machine configured to house a multi-functional peripheral device, the multi-functional peripheral device including at least:
  at least one sensor device configured to detect at least one sensory input from the portable electronic device, wherein the at least one sensor device comprises at least one accelerometer;
  a second memory having a second money transfer program configured to wirelessly transfer funds; and
  a second processor configured to;
   (i) receive, from the portable electronic device, the request to transfer funds;
   (ii) determine if the at least one sensory input is to transfer funds to the gaming machine or transfer funds to the portable electronic device based on the at least one sensory input;
   (iii) execute the second money transfer program to transfer funds to the gaming machine if it is determined that the at least one sensory input is to transfer funds to the gaming machine; and
   (iv) execute the second money transfer program to transfer funds to the portable electronic device if it is determined that the at least one sensory input is to transfer funds to the portable electronic device.

9. The system of claim 8, wherein the at least one sensor device comprises a microphone, a touchpad, a touchscreen, a radio frequency identification reader, a near-field magnetic reader, or a camera.

10. The system of claim 8, wherein the at least one sensory input is an audio input, a visual input, or a physical contact.

11. The system of claim 8, wherein the transferred funds are used to play a game of chance on the gaming machine when the funds are transferred to the gaming machine.

12. The system of claim 8, wherein the request to transfer funds is a request to transfer a preset fund amount.

13. The system of claim 8, wherein the first money transfer program is configured to transmit a request to withdraw funds.

14. The system of claim 13, wherein the second money transfer program is configured to transfer funds from the gaming machine to the portable electronic device.

15. The system of claim 8, wherein the second money transfer program is further configured to wirelessly transfer a digital receipt.

16. The system of claim 8, further comprising:
 a location server configured to track a location of the portable electronic device and the multi-functional peripheral device;
 an authorization server including:
  a memory having a location verification program configured to authorize funds transfer;
  a database configured to store a plurality of local jurisdictional gaming rules; and
  a third processor configured to:
   (i) receive a funds transfer request;
   (ii) execute the location verification program;
   (iii) determine if the tracked location of the portable electronic device and the multi-functional peripheral device conflict with at least one jurisdictional gaming rule;
   (iv) disallow the funds transfer request if it is determined that the tracked location of the portable electronic device and the multi-functional peripheral device conflicts with the at least one jurisdictional gaming rule; and
   (v) permit the funds transfer request if it is determined that the tracked location of the portable electronic device and the multi-functional peripheral device do not conflict with the at least one jurisdictional gaming rule.

17. A method for transferring funds using a multi-functional peripheral device housed within a housing of a gaming device, comprising:
 receiving, at the multi-functional peripheral device, at least one sensory input from a portable electronic device, wherein the at least one sensory input is provided by at least one accelerometer;
 determining whether to initiate a transfer of funds to or from the gaming device based on the at least one sensory input, the transfer of funds including a fund amount; and
 transferring funds from the portable electronic device to the gaming device via the multi-functional peripheral device if it is determined that the transfer of funds to the gaming device is to be initiated, wherein the fund amount is used to play a game of chance on the gaming device, wherein the multi-function peripheral device is a peripheral for the gaming machine and is housed at least partially internal to the housing of the gaming device.

18. The method of claim 17, further comprising transferring funds from the gaming device to the portable electronic device via the multi-functional peripheral device if it is determined that the transfer of funds to the portable electronic device is to be initiated.

19. The method of claim 18, further comprising transferring a digital receipt to the portable electronic device.

20. The method for transferring funds of claim 17, wherein the gaming device is in communication with a gaming server, and
wherein the transferring of funds includes transmitting the fund amount from the multi-functional peripheral device to the gaming server via the gaming device.

21. The method for transferring funds of claim 17, wherein the at least one sensory input is provided by at least one sensor device, the at least one sensor device comprises a microphone, a touchpad, a touchscreen, a radio frequency identification reader, a near-field magnetic reader, or a camera.

22. The method for transferring funds of claim 17, wherein the determining further comprises:
verifying a location of the transaction; and
preventing the transaction if the location does not meet at least one local jurisdiction rule.

23. A bill acceptor to communicate with a gaming device, comprising:
a value receiving device configured to receive bills or coins;
at least one sensor device configured to receive at least one sensory input;
a memory having at least one money transfer program configured to execute a wireless transfer of funds;
a processor configured to;
detect the at least one sensory input from the at least one sensor device;
determine if the at least one sensory input is associated with the at least one money transfer program;
determine if the at least one sensory input is to transfer money to the gaming device or transfer money to a portable electronic device if it is determined that the at least one sensory input is associated with the at least one money transfer program;
execute the at least one money transfer program to transfer money to the gaming machine if it is determined that the at least one sensory input is to transfer money to the gaming machine; and
execute the at least one money transfer program to transfer money to the portable electronic device if it is determined that the at least one sensory input is to transfer money to the portable electronic device,
wherein the sensory input is received from the portable electronic device and wherein the wireless transfer of funds occurs between the portable electronic device and the gaming device via the at least one money transfer program and the sensory input,
wherein the bill acceptor is at least partially housed within the gaming device.

24. The bill acceptor of claim 23, wherein the at least one sensory input is provided by the at least one sensor device, the at least one sensor device comprises at least one accelerometer, a microphone, a touchpad, a touchscreen, a radio frequency identification reader, a near-field magnetic reader, or a camera.

25. The bill acceptor of claim 23, wherein the wireless transfer of funds yields a source of funding to play a game of chance on the gaming device.

26. The bill acceptor of claim 25, wherein the bill acceptor further comprises a camera configured to detect at least one user gesture, wherein the at least one user gesture is used to play the game of chance on the gaming device.

27. The bill acceptor of claim 23, wherein the bill acceptor comprises a display configured to present a notification that the wireless transfer of funds was successful.

28. The bill acceptor of claim 23, wherein the processor is further configured to transmit a digital receipt to the portable electronic device on completion of the wireless transfer of funds.

* * * * *